United States Patent
Gentile et al.

(10) Patent No.: US 9,471,571 B2
(45) Date of Patent: *Oct. 18, 2016

(54) DIGITAL MEDIA ALBUM CREATOR

(71) Applicant: IBoard Incorporated, Pennington, NJ (US)

(72) Inventors: Christopher T. Gentile, Pennington, NJ (US); Adam Nemitoff, Glen Rock, NJ (US)

(73) Assignee: IBoard Incorporated, Pennington, NJ (US)

( * ) Notice: Subject to any disclaimer, the term of this patent is extended or adjusted under 35 U.S.C. 154(b) by 376 days.

This patent is subject to a terminal disclaimer.

(21) Appl. No.: 14/088,584

(22) Filed: Nov. 25, 2013

(65) Prior Publication Data

US 2014/0181660 A1 Jun. 26, 2014

Related U.S. Application Data

(63) Continuation of application No. 13/589,627, filed on Aug. 20, 2012, now Pat. No. 8,601,372.

(51) Int. Cl.
*G06F 3/0481* (2013.01)
*G06F 17/30* (2006.01)
*G06F 3/0484* (2013.01)
*G11B 27/034* (2006.01)
*G11B 27/34* (2006.01)

(52) U.S. Cl.
CPC ....... *G06F 17/30017* (2013.01); *G06F 3/0484* (2013.01); *G11B 27/034* (2013.01); *G11B 27/34* (2013.01)

(58) Field of Classification Search
CPC .......... G06F 17/30017; G06F 3/0484; G06F 17/30; G06F 17/3028; G06F 17/30867
USPC ................. 715/723, 731, 202, 716
See application file for complete search history.

(56) References Cited

U.S. PATENT DOCUMENTS

| | | | |
|---|---|---|---|
| 6,418,421 | B1 | 7/2002 | Hurtado et al. |
| 7,096,203 | B2 | 8/2006 | Pence et al. |
| 7,774,431 | B2 | 8/2010 | Conn et al. |
| 7,822,687 | B2 | 10/2010 | Brillon et al. |
| 7,843,581 | B2 | 11/2010 | Hill et al. |
| 7,899,887 | B2 | 3/2011 | Conn et al. |
| 7,925,590 | B2 | 4/2011 | Jain |
| 8,060,825 | B2 | 11/2011 | Chaudhri |
| 2004/0210845 | A1 | 10/2004 | Paul et al. |

(Continued)

*Primary Examiner* — Namitha Pillai
(74) *Attorney, Agent, or Firm* — Davidson, Davidson & Kappel, LLC

(57) ABSTRACT

A computerized method is provided that includes (a) receiving from the user a selection of one of a plurality of templates for the digital media album; (b) receiving from the user a subset of media album components; (c) in response to a user input, compiling an interim multimedia album using the selected template, the subset of media album components, and default data for each media album component not included in the subset of media album components, and thereafter displaying to the user the interim multimedia album; (d) receiving from the user additions to the subset of the media album components, and repeating step (c) with the subset including said additions; (e) receiving from the user further additions to the subset of the media album components until all of said media album components are received; and (f) compiling the created multimedia album using the selected template and said media album components.

20 Claims, 51 Drawing Sheets

(56) References Cited

U.S. PATENT DOCUMENTS

| | | |
|---|---|---|
| 2007/0064121 A1 | 3/2007 | Issa et al. |
| 2008/0141108 A1 | 6/2008 | Matsuura |
| 2011/0161377 A1 | 6/2011 | Reed, Jr. et al. |
| 2011/0202646 A1 | 8/2011 | Bhatia |
| 2011/0209224 A1 | 8/2011 | Gentile |

ADD SONG [X] [DELETE]

- SONG #: 1
- SONG TITLE*: EYE TO EYE — 4011
- ISRC CODE: EXAMPLE: CC-XXX-YY-NNNNN [?] — 4012
- SONG FILE*: ♫ 2_EYETOEYE.MP3
  UPLOAD NEW | DELETE — 4013
- LYRICS: — 4014

```
BLOOD AND WINE MAY FLOW
ONLY LOVE AND WAR MAKE HISTORY
WE MUST SHARE FLESH AND BONE
BUT WE DON'T SHARE PHILOSOPHY

SOME PEOPLE GOT A WAYS TO GO
SOME LESSONS THEY WON'T EVER LEARN
TO KEEP YOUR ENEMIES CLOSE
THE OTHER CHEEK YOU SOON WILL TURN

IF WE DON'T SEE EYE TO EYE
THAT DOESN'T MEAN THAT WE CAN'T TRY
TO GET ALONG
IF WE DON'T SEE EYE TO EYE
NO MATTER WHAT, YOU AND I
WE BELONG TOGETHER
```
IMPORT NEW OR EDIT THE TEXT ABOVE — 4001

- CREDITS:

```
WRITTEN BY: SHERYL CROW, DOYLE BRAMHALL II,
JUSTIN STANLEY
FSMGI (IMRO) / OLD CROW MUSIC ADMINISTERED
BY CHRYSALIS ONE SONGS (BMI), WIRZMA
PUBLISHING ADM BY BUG MUSIC (BMI),
SOUNDHUSTLER MUSIC (BMI)

VOCALS, BACKGROUND VOCALS: SHERYL CROW
ELECTRIC GUITARS, GANG VOCALS: KEITH RICHARDS
ELECTRIC GUITAR, ACOUSTIC GUITAR, BACKGROUND
```
— 4015

IMPORT NEW OR EDIT THE TEXT ABOVE — 4017

- [ ] INCLUDE HI-REZ IMAGE CONTENT
- LABEL**: — 4018
- FILE**: — 4019

IMAGE FILE:
DIMENSIONS:
RECOMMENDED IMAGE DIMENSIONS:
2500x1500 PIXELS (MINIMUM)

ADD FILE — 4020
- LICENSE*: ○ ORIGINAL OR PUBLIC DOMAIN SONG [?] — 4021
  ● COVER SONG [?] — 4024

[CANCEL] — 4022   [ADD ANOTHER] — 4023   [DONE]

*ASTERISK DENOTES A REQUIRED FIELD
**REQUIRED IF "INCLUDE HI-REZ IMAGE CONTENT" IS CHECKED

V-ALBUM CREATOR
*powered by iBoard* BETA

CKAPPEL@DDKPATENT.COM | LOGOUT | HELP ☐ ☒

| HOME | DETAILS | BACKGROUNDS | SONGS | PHOTOS | VIDEOS | BOOKLET | SHOP | ARTIST LINKS | HISTORY | CREDITS |

SONGS

[ADD SONG]

SHOWGUN - SMFF  [PREVIEW]

2017

| # | TITLE 🔒 | SONG FILE | LYRICS | CREDITS | LICENSE |
|---|---|---|---|---|---|
| 1 | ⊘ EYE TO EYE | ⊘ | ⊘ | ⊘ | ⊘ COVER |
| 2 | ⊘ SIGN YOUR NAME | ⊘ | ⊘ | ⊘ | ⊘ ORIGINAL |

40

[SONG ASSET REQUIREMENTS →]     [SECTION IN PROGRESS]

⊘ COMPLETED   ⊘ REQUIRED   ⊘ OPTIONAL

☐ THIS SECTION IS COMPLETE [?]

V-ALBUM CALCULATOR

YOUR V-ALBUM NUMBERS

| | |
|---|---|
| V-ALBUM RETAIL PRICE: | $ 0 |
| V-ALBUM FILE SIZE (MB): | 76 |
| ARTIST V-ALBUM NET PROFIT: | N/A |

RETAIL PRICE MUST BE SET.

V-ALBUM FEES SUBTRACTED FROM RETAIL PRICE*

| | |
|---|---|
| V-ALBUM PURCHASE TRANSACTION FEES (PAYPAL COST): | $0.30 |
| V-ALBUM DOWNLOAD/STORAGE COSTS: | $0.25 |
| V-ALBUM LICENSING FEE: | $2.00 |
| TOTAL V-ALBUM FEES SUBTRACTED FROM RETAIL PRICE: | $2.55 |

ADDITIONAL FEES THAT YOU MAY BE RESPONSIBLE FOR

| | |
|---|---|
| MECHANICAL FEES: | $ |
| LYRICS FEES: | $ |
| OTHER FEES: | $ |
| OTHER FEES: | $ |
| OTHER FEES: | $ |
| OTHER FEES: | $ |
| TOTAL ADDITIONAL FEES: | $0.00 |

*THESE DEDUCTIONS ARE ESTIMATES ONLY AND ARE SUBJECT TO CHANGE.

[CANCEL] [CONTINUE]

FIG. 14C

V-ALBUM CALCULATOR

YOUR V-ALBUM NUMBERS

| | |
|---|---|
| V-ALBUM RETAIL PRICE: | $ 10.00 |
| V-ALBUM FILE SIZE (MB): | 76 |
| ARTIST V-ALBUM NET PROFIT: | $7.16 |

V-ALBUM FEES SUBTRACTED FROM RETAIL PRICE*

| | |
|---|---|
| V-ALBUM PURCHASE TRANSACTION FEES (PAYPAL COST): | $0.59 |
| V-ALBUM DOWNLOAD/STORAGE COSTS: | $0.25 |
| V-ALBUM LICENSING FEE: | $2.00 |
| TOTAL V-ALBUM FEES SUBTRACTED FROM RETAIL PRICE: | $2.84 |

ADDITIONAL FEES THAT YOU MAY BE RESPONSIBLE FOR

| | |
|---|---|
| MECHANICAL FEES: | $ 0.00 |
| LYRICS FEES: | $ |
| OTHER FEES: | $ |
| OTHER FEES: | $ |
| OTHER FEES: | $ |
| TOTAL ADDITIONAL FEES: | $0.00 |

*THESE DEDUCTIONS ARE ESTIMATES ONLY AND ARE SUBJECT TO CHANGE.

[CANCEL] [CONTINUE]

---

9026

V-ALBUM
powered by iBo...

HOME | DETAILS | ...

PUBLISHING: RETAIL INFO

ON SALE DATE*: 7/25/2...
UNIVERSAL PRODUCT CODE (UPC)*: CLICK ...
RETAIL SALES PRICE*: NOT YE... CLICK ...

*DENOTES REQUIRED ITEM

[CANCEL]

---

...T.COM | LOGOUT | HELP

...TIST LINKS | HISTORY | CREDITS

SETUP FEE — UPLOAD — UPLOAD COMPLETED

[← BACK] [CONTINUE →]

V-ALBUM CREATOR
powered by iBoard  BETA

CKAPPEL@DDKPATENT.COM | LOGOUT | HELP  [_][X]

| HOME | DETAILS | BACKGROUNDS | SONGS | PHOTOS | VIDEOS | BOOKLET | SHOP | ARTIST LINKS | HISTORY | CREDITS |

RETAIL INFO — LEGAL — SETUP FEE — UPLOAD — UPLOAD COMPLETED

PUBLISHING: LEGAL

AS A CONDITION OF THE PUBLICATION AND SALE OF THE CREATED V-ALBUM, I HEREBY ACKNOWLEDGE THAT I HAVE READ AND AGREE TO THE V-ALBUM CREATOR TERMS OF SERVICE AND PRIVACY POLICY
○ NO   ⦿ YES — 9031

I HEREBY CERTIFY THAT ALL INFORMATION INCLUDED IN THIS V-ALBUM IS COMPLETE AND ACCURATE AND I HOLD HARMLESS ALL OTHER PARTIES FROM ANY CLAIMS OF ERRORS OR OMISSIONS WHICH MIGHT ARISE THEREFROM.
○ NO   ⦿ YES — 9032

BY SELECTING "YES" IN EACH SECTION BELOW, I HEREBY CERTIFY THAT I HAVE, OR HAVE ACQUIRED, THE RIGHT TO PUBLISH AND SELL ALL CONTENT AND ASSETS THAT HAVE BEEN UPLOADED AND/OR INTEGRATED AS PART OF THIS V-ALBUM. THIS INCLUDES, BUT IS NOT LIMITED TO:

9033 — ORIGINAL AND/OR PUBLIC DOMAIN SONGS:   ○ NO  ○ YES  [?] — 9040
9034 — COVER SONGS:   ○ NO  ○ YES  [?] — 9041
9035 — LYRICS:   ○ NO  ○ YES  [?] — 9042
9036 — PHOTOS:   ○ NO  ○ YES
9037 — VIDEOS:   ○ NO  ○ YES

GRAPHICS/BACKGROUND TEXTURES:   ○ NO  ○ YES — 9038
SHOP ASSETS AND LINKS:   ○ NO  ○ YES — 9039

9030

[CANCEL]                                              [← BACK]  [CONTINUE →]

V-ALBUM CREATOR
*powered by iBoard* BETA

CGENTILE@MCSQD.COM | LOGOUT | HELP

| HOME | DETAILS | BACKGROUNDS | SONGS | PHOTOS | VIDEOS | BOOKLET | SHOP | ARTIST LINKS | HISTORY | CREDITS |

HOME | PROJECT LIST | V-ALBUM SALES

CREATE NEW V-ALBUM

| ARTIST NAME | V-ALBUM TITLE | LAST MODIFIED ▼ | REV # | STATUS | ON SALE DATE |
|---|---|---|---|---|---|
| DANIEL & EVELINA | THE FAIRYTALE WEDDING V-ALBUM DEMO | 7/19/2012 | 1 | PUBLISHED | 11/18/2011 |
| NATHAN | NATHAN V-ALBUM | 7/12/2012 | 1 | PRODUCTION | – |
| SCOTT | SCOTT V-ALBUM | 7/11/2012 | 1 | PRODUCTION | – |
| BOB | BOB ROHINSKY V-ALBUM | 7/10/2012 | 1 | PRODUCTION | – |
| MICHAEL | MICHAEL'S V-ALBUM | 6/18/2012 | 1 | PRODUCTION | – |
| ALAN | ALAN'S V-ALBUM | 6/15/2012 | 1 | PRODUCTION | – |
| DAVID MASION | DAVID V-ALBUM | 6/7/2012 | 1 | PRODUCTION | – |
| HERMAN | HERMAN V-ALBUM | 6/1/2012 | 1 | PRODUCTION | – |
| DISNEY'S | WINNIE THE POOH V-ALBUM | 5/31/2012 | 8 | REVISING | 10/13/2011 |
| DAVID LANE | TOUCHTUNES V-ALBUM | 5/24/2012 | 1 | PRODUCTION | – |

10

FULL VA SPEC DOC

DIGITAL MEDIA ALBUM CREATOR

CROSS-REFERENCE TO RELATED APPLICATIONS

This application expressly incorporates herein by reference, the entire originally filed contents of U.S. patent application Ser. No. 13/589,627 filed on Aug. 20, 2012, issued as U.S. Pat. No. 8,601,372 and U.S. patent application Ser. No. 12/706,545, filed on Feb. 16, 2010, and published as U.S. Pre-Grant Publication No. 2011/0202646, issued as U.S. Pat. No. 8,639,772 and U.S. patent application Ser. No. 12/711,975, filed on Feb. 24, 2010, and published as U.S. Pre-Grant Publication No. 2011/0209224.

BACKGROUND

Music, and the media on which music is provided, has experienced a rapid evolution in the computer age. Digital audio files, such as MP3s, have become the norm for audio track distribution. A user may download one song from a band, several songs from across multiple albums, or may accumulate all of the songs in a released album. Selling a set of digital audio files, where the set includes the same tracks as a retail CD release, is already performed by several MP3 e-commerce sites. Often, they will price together all the MP3s that correspond to the tracks of an album release, and sometimes offer a discount for the album set as compared to the sum of each song individually. However, this is generally the extent of so-called digital albums in the prior art, i.e., a collective pricing together of individual audio files according to the songs found on a released album. Many musical artists and groups believe this is a detriment to the experience of their fans. Acknowledging the primary experience may be in the music itself, these artists believe much is lost by stripping these songs of the other aspects of a total album experience.

U.S. Pre-Grant Publication No 2011/0209224 describes a virtual or digital multimedia album, or V-Album. The digital album may include a collection of related media to provide virtually, what a traditional band album provides, and more. The digital album may include a set of digital audio files that replicate or substantially resemble the set of tracks found on a traditional album. Additional media, such as videos, lyric text, other text, images, and user-imported content may all be included in the digital album.

SUMMARY OF THE INVENTION

In accordance with an embodiment of the present invention, a computerized method is provided for allowing a user to create a digital media album through a graphical user interface. The created multimedia album (i.e. the multimedia album created by the process) has media album components which include at least a name, a plurality of audio media, a plurality of image media, and text associated with each of the plurality of audio media.

This method of producing the created multimedia album comprises, performing, with a computer the steps of: (a) receiving from the user a selection of one of a plurality of templates for the digital media album, each template defining at least a layout of the media album components in the created digital media album, a navigation among components of the created multimedia album, and a sequence of display of the media album components of the created multimedia album; (b) receiving from the user a subset of the media album components; (c) in response to a user input to the graphical user interface, compiling an interim multimedia album using the selected template, the subset of media album components, and default data for each media album component not included in the subset of media album components, and thereafter displaying to the user the interim multimedia album, wherein the displayed interim multimedia album includes the layout, navigation, and the sequence of display of the selected template; (d) receiving from the user additions to the subset of the media album components, and repeating step (c) with the subset including said additions; (e) receiving from the user further additions to the subset of the media album components until all of said media album components are received; and (f) compiling the created multimedia album using the selected template and said media album components.

The above-referenced embodiment may also optionally include other features, discussed below. These optional features or aspects can be included alone or in any combination.

For example, the created multimedia album may be created as a single data file from which individual digital audio files can be extracted. The single data file may include the digital audio files and remaining data, where the remaining data includes Digital Rights Management (DRM) and where the digital audio files do not include DRM. Alternatively, the digital audio files may include DRM.

In accordance with other aspects of this embodiment, the interim media album may be created as a single data file from which individual digital audio files can be extracted. Alternatively, the created multimedia album may be created as a single data file, and the interim multimedia albums created as multiple files.

With regard to the media album components, the plurality of audio media may include digital audio files of a single artist or band, wherein the text associated with each of the plurality of audio files includes a song title and song lyrics associated with each of the plurality of audio files. The media album components may further include video, information regarding the artist or band and/or links to merchandise associated with the single artist or band. The images may include one or more of an album cover image (front and/or back), a background texture image, and a color theme.

In accordance with other aspects of the embodiments of the present invention, the method may also include uploading the created media album to a server, receiving, at the server, a request from a consumer to purchase the created multimedia album; processing, at the server, payment from the consumer; and downloading the created multimedia album to the consumer.

The step of uploading may further include uploading the created media album onto a custom web page for said created media album, where the custom web page has a unique URL, includes a cover image for the created media album, a description of the created media album, a sales price of the created media album, and a purchase button. The step of uploading may further include receiving from the user, a publishing fee, wherein the publishing fee authorizes the user to sell the created media album a limited number of times (e.g., a number of times N, wherein $1<N<\infty$). The method may further include disabling the custom web page after a number of purchases from consumers equals N.

In accordance with other aspects of the embodiments of the present invention, method can track and/or pay various publishing rights. For example, the method may include receiving, from the user, information regarding publishing rights and/or cover rights associated with the media components. The method may further include automatically purchasing at least some of the publishing rights and/or the cover rights. The method may include automatically paying royalties to a third party in accordance with the publishing rights and/or the cover rights in association with each sale of the created media album.

In accordance with other aspects of the embodiments of the present invention, method can provide, in response to user input, a report of all sales of the created media album. The report may be a real-time sales report.

In accordance with further embodiments of the present invention, non transitory computer readable media are provided, having stored thereon, computer executable process steps operable to control a computer to perform the steps described above.

BRIEF DESCRIPTION OF THE DRAWINGS

FIG. 4 shows an exemplary graphical user interface showing a details tab screen for a preferred embodiment of the present invention.

FIG. 5 shows the details tab screen with the edit image pop up screen displayed.

FIGS. 7B and 7C show the backgrounds tab screen with the edit background assets pop up screen displayed.

FIG. 8B shows the songs tab screen with add song pop up screen displayed.

FIG. 8C shows the songs tab screen of FIG. 8A with two songs added.

FIG. 11B shows the videos tab screen of FIG. 11A with an add video pop up screen displayed.

FIG. 11C shows the videos tab screen of FIG. 11A with a video added.

FIGS. 12A, 12B, 12C, and 12D show exemplary graphical user interfaces showing the booklet tab screen, shop tab screen, artist tab screen, and history tab screen, respectively.

FIG. 13A shows an exemplary graphical user interface showing a credits tab screen.

FIG. 14B shows a retail information pop up screen.

FIG. 14C shows a set retail price calculator pop up screen.

FIG. 14D shows the pop up screen of FIG. 14C with a retail price of $10.00 entered.

FIG. 14E shows the screen of FIG. 14B with all information entered.

FIG. 15A shows a legal information pop up screen.

FIGS. 15B, C, and D show an original or public domain information pop up screen, a cover song information pop up screen, and a lyrics information pop up screen.

FIG. 15E shows the screen of FIG. 15A with all information entered.

FIG. 16D shows the home tab screen of FIG. 1 with a published digital media album.

FIG. 16E shows the details tab screen of FIG. 4 for a published digital media album.

FIG. 17A shows a custom web page for allowing consumers to purchase a published digital media album.

DETAILED DESCRIPTION OF EXAMPLE EMBODIMENTS

Figure 1:
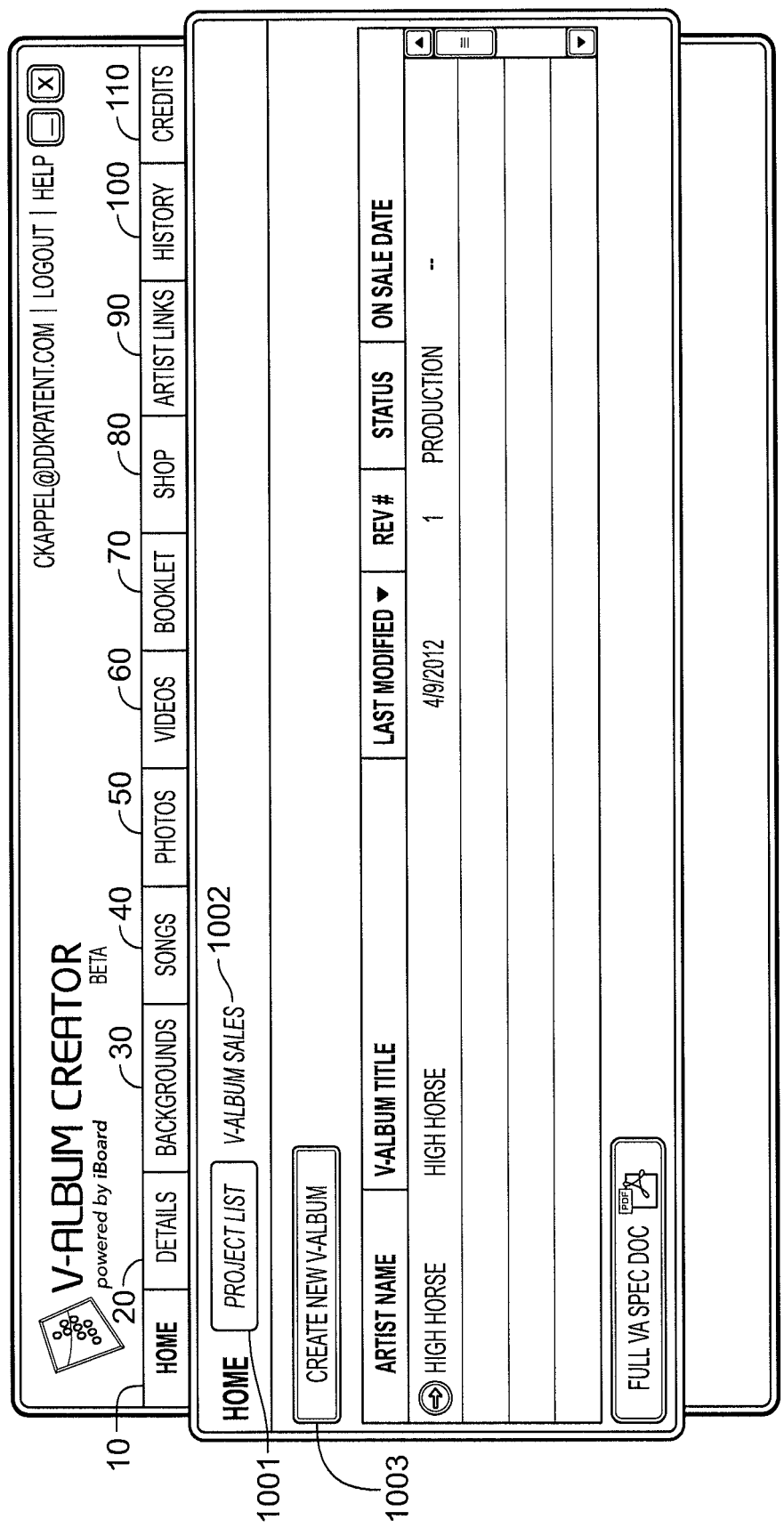
FIG. 1 shows an exemplary graphical user interface showing a home tab screen for a preferred embodiment of the present invention

In accordance with an embodiment of the present invention, a simple, automated method is provided for creating a virtual or digital multimedia album or V-Album of the general type described in U.S. Pre-Grant Publication No 2011/0209224. The multimedia album created may be a single data file which, when executed, extracts into individual into individual music files displayed in association with lyrics, photos, and/or videos in accordance with a defined presentation and navigation scheme, such that the individual music files, lyrics, photos, and/or videos can be played/viewed. In accordance with an embodiment of the present invention, the method provides a graphical user interface into which the user can enter content for the digital multimedia album including digital audio files, such as digital music files for one or more songs, digital video, digital still images, including for example, images for a cover, back, background and interior of the multimedia album, lyrics associated with one or more of the digital music files, credits associated with one or more of the digital music files, IRC codes for the digital music files, as well as publishing information including a desired sales price, UPC code, and on sale date. In accordance with the method, once the user has entered at least a name for the multimedia album, the method will, upon user selection by, for example, selecting a "preview button", compile a multimedia album which may be presented via the media presentation function in the same manner that a completed digital media album presents, except with default information inserted for missing data. The user can then add additional information, and again select the preview button to see a presentation of the multimedia album with the additional information, with default information inserted for missing data. This iterative process can be repeated an unlimited number of times as the user the builds the completed digital media album. As used herein, the term "the created digital media album" refers to the completed digital media album created at the end of the process, whereas the term "interim digital media album" refers to the digital media albums which can be compiled during the creation process, using partial information.

In accordance with the above-referenced embodiment, the user can select one of a plurality of templates for the digital media album from the graphical user interface. Each template may define at least a layout of the media album components in the created digital media album, a navigation among components of the created multimedia album, and a sequence of display of the media album components of the created multimedia album. For example, one template may show the background texture image in the background of the screen, then show the front cover image, and then show the interior of the album with each song and photos displayed as if a physical CD, vinyl or tape album were being opened, except that navigation links are provided to play the songs and videos. Another template may show the background texture image in the background of the screen, and then show the front cover image, and provide navigation links for the songs, photos, videos, album cover and album credits. Further, in some or all of the templates, the lyrics of each song may be available to the user, and may automatically display when a song is selected and/or played. Also, a template may provide that the display indicate where in the textual lyrics the digital audio file is currently playing, e.g., similar to a karaoke or "sing along" system, i.e., scrolling textual lyrics. Other features may be available. For example, the user may be able to start a slide show of the included images that plays during song playback. Another example may have a slideshow synchronize with the playback audio, e.g., rotating through images according to the tempo of the currently playing digital audio file.

When completed, the compiled V-Album can be uploaded by the user for sale to members of the public via a unique installation link, for example, a custom website with a unique URL from which the compiled V-Album can be downloaded. This installation link can be set for X number of installations or sales. After "X" number of installs are completed with this unique installation link, then the link becomes invalid for any future installations.

After the user completes the publication of a V-Album creation, the VA Creator system automatically generates a custom web page with its own unique URL, and includes the V-Album's cover art, description of the V-Album and what it includes, and a purchase button with the sale price, as determined by the author. This unique URL can then be utilized by the author to market and sell their V-Album creation over the internet.

The VA Creator also includes an integrated real-time sales reporting system, and the author can see all of the sales, to the minute, of any V-Album that they have published.

As explained above, the VA Creator may generate a unique serial number (e.g., UPC code) to be associated with the album. The album may be created as a single data file from which individual digital audio files can be extracted. The album may maintain a common theme, wherein all digital media is related to the common theme. The common theme may include songs by a single artist or band, digital video performances by the single artist or band, digital photos by the single artist or band, album song lyrics, and information about the single artist or band. Further, each of the song pointers may illustrate whether there is associated digital audio with the pointer. The album may allow the end user to import media; including associating end user supplied digital audio with a pointer and adding user created content. The album may include links to merchandise associated with the digital media and/or the relevant artist.

As explained above, the V-Album created may be configured to be downloaded by an end user as a single file. After being downloaded, the single file may be "unpacked" into multiple files. The digital audio may be stored without Digital Right Management (DRM) protection, such that the digital audio may be used on any number of digital audio players (e.g., MP3 player). Other example data may be stored in encrypted form or include other DRM protection. The example data may be stored in partitions, and may include a "shrinking install" where each partition may be removed from the example install data as it is installed.

More generally, the V-Album created by the digital media album creator in accordance with the embodiments of the present invention (also referred to as "the created digital media album to contrast with interim iterations of the digital media album that can be previewed during the creation process) may include any of the features described in U.S. Pre-Grant Publication No 2011/0209224, incorporated by reference herein. The digital album may contain customary navigation and menu options, such as the arrow navigation buttons in the video and photo areas. The digital album may include any number of other relevant features. Further, although specific features as illustrated in the drawings as discussed below as implemented as tabs, buttons, or links, it should be understood that alternative navigation, actuation, and display techniques can alternatively be used.

The created digital media album, as discussed above, may be a collection of different components (e.g., audio files, video files, image files, etc.). However, to minimize the load on the distribution server(s), and thus minimize the cost of product distribution, the digital album may download as a single file. For example, an encrypted digital album file may be "wrapped up" with individual unencrypted MP3 files A to N. In alternative embodiments, the created digital media album may be distributed in more than one data packages, or from more than one distribution source.

The created digital media album may run on a digital album player, which may provide the common logic and utilities (e.g., multi-media player(s)) for one or more digital albums. Alternatively, each created digital media album may contain its own logic, using frameworks already on the installing system (e.g., Java plug-ins, media APIs, etc.). The single created digital media album download file may consist of two main parts. First, a set of unencrypted digital audio files, e.g., MP3A to MP3N. Second, an encrypted file, set of files, or other data structure, which may contain all of the other digital album content, e.g., videos, images, lyrics, text, etc. This file may be referred to as the "V-Wrap" and include all of the digital content and data for the V-Album, other than the MP3 files. The V-Wrap may however, include song previews for any song associated with the V-Album, but for which there is no associated digital audio file of the complete song. In alternative embodiments, the digital audio files may be encrypted as well, or contain any number of DRM protection. However, common industry practice has evolved into allowing MP3s to be unencrypted and free of DRM protections. Likewise, the digital album data (e.g., V-Wrap) may be unencrypted, or partially unencrypted. The install process may also include a "shrinking" install. During most install processes, an install file is executed to fully install a target program or data, and only upon completion is the entire install file then removed or marked for eventual overwrite. Here, however, because the single install file may contain very large media files, the total file may be quite large. For example, a single four-minute music video in true high definition (HD) and native (e.g., minimal) compression, may consume over three gigabytes of disk space. Since digital albums may contain many songs and other videos, a complete set of content may include disk sizes around a hundred gigabytes. Of course this is only one example embodiment, and stronger compression, lower definition, or other space saving measures may be used. Regardless, a particular install may be quite large for some systems and users. The shrinking install allows for the amount of space needed, above the sum total size of the install file, to be no larger than the largest piece. In this way, the installer may unpack a video file, install that file in the system, and then delete that portion of the install file, thus "shrinking" the install file as pieces are no longer needed.

FIG. 1 illustrates a graphical user interface screen for a virtual multimedia album creator ("VAC") software program in accordance with the present invention. The VAC software is executable on a general purpose computer, and can, for example, be downloaded and installed on computer by a consumer as is known in the art. Referring to FIG. 1, the graphical user interface screen includes a plurality of tabs which are selectable by a user input device, including for example, a home tab 10, a details tab 20, a background tab 30, a songs tab 40, a photos tab 50, a videos tab 60, a booklet tab 70, a shop tab 80, an artist links tab 90, a history tab 100 and a credits tab 110. FIG. 1 could be an initial GUI screen which is displayed after a user logs into the VAC program. In this example, the home tab 10 has been automatically selected upon log-in and the home tab screen display is shown, which itself includes a project list tab 1001 (which is selected and shown) and a V-Album sales tab 1002 (not selected). On the project list tab screen in this example, the user has a previously created V-Album named "High Horse", last modified on Apr. 9, 2012, which has a status of "in production", meaning it has not yet been published. The on-sale date is blank because it is still in production, and thus is not available for purchase.

Figure 2:
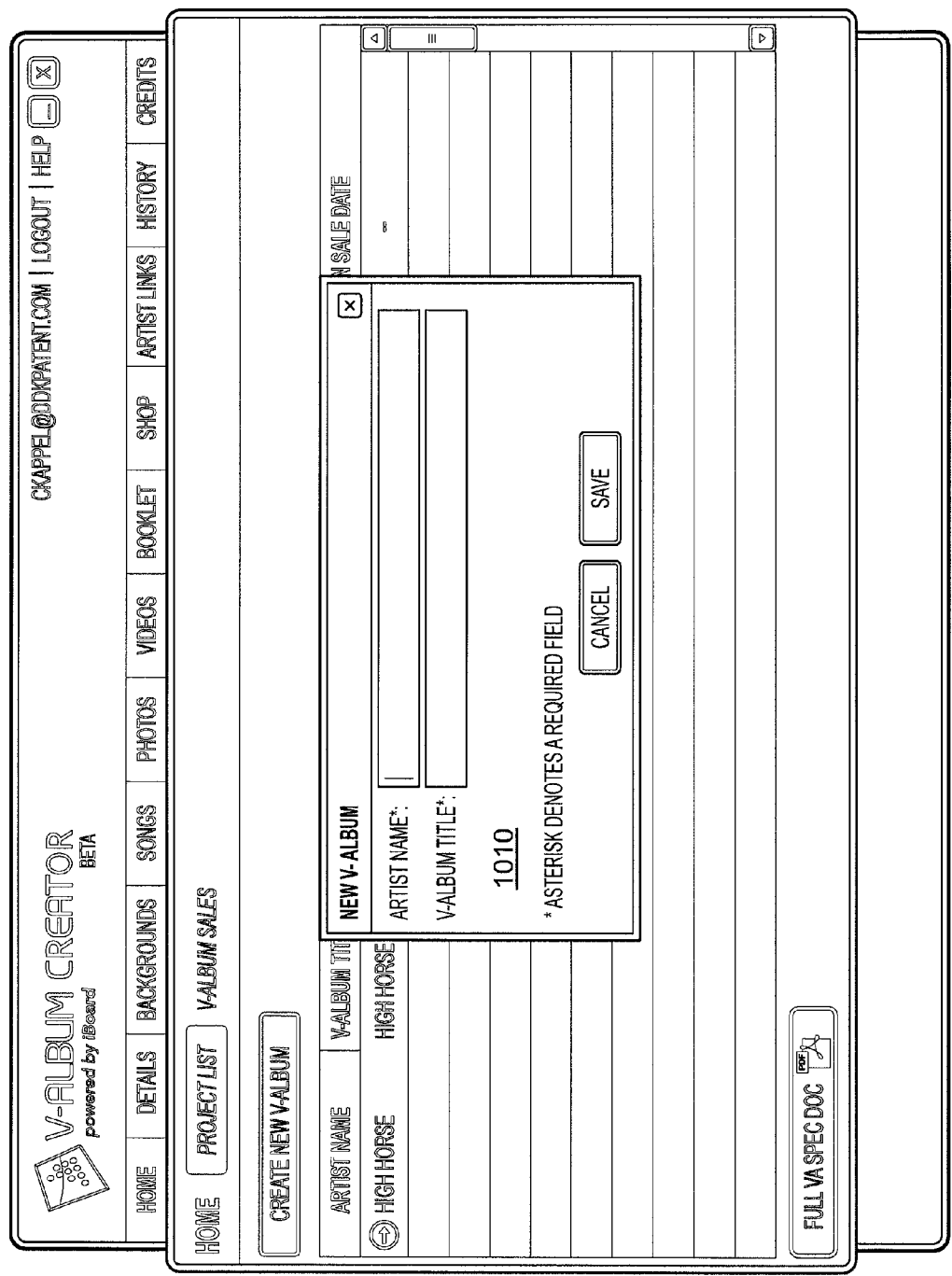
FIG. 2 shows the home tab screen of FIG. 1 with a new V-Album dialog box displayed
Figure 3:
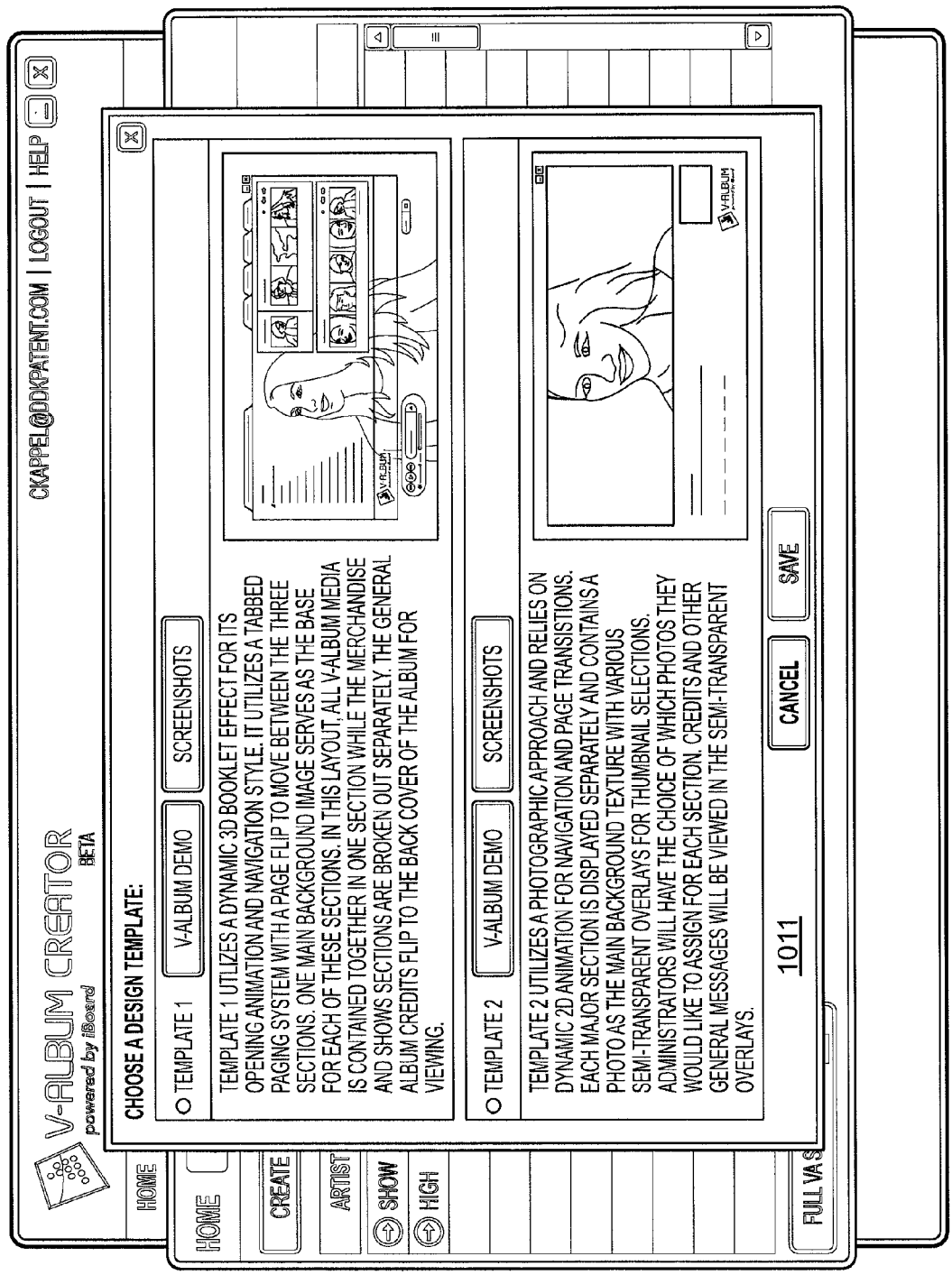
FIG. 3 shows the home tab screen of FIG. 1 with the design template selection pop up screen displayed.
Figure 4:
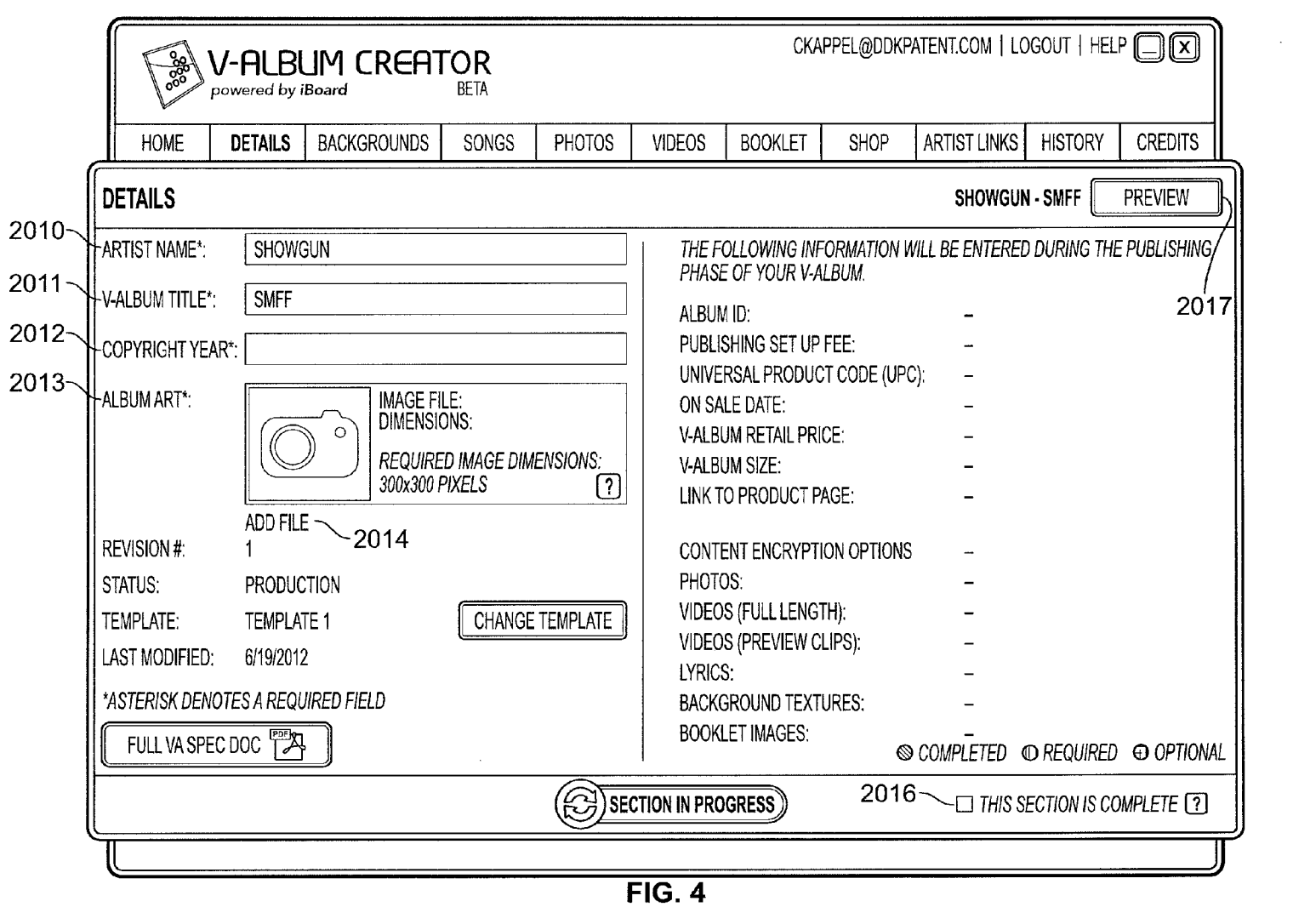

To create a new V-Album, a user selects the "create new v-album" button 1003, which causes a dialog box to appear into which the user can enter an artist name and V-Album title as illustrated in FIG. 2. As one of ordinary skill in the art will appreciate, user selection or other data entry can be implemented by any conventional user input device, including a mouse, keyboard, or touchscreen as non-limiting examples. Once the artist name and title are saved, the user is prompted to select a design template from a design template screen 1011 as illustrated in FIG. 3. In the example of FIG. 3, there is a choice of two design templates (template 1 and template 2) which differ in the sequence and arrangement of V-Album created with the VAC software. Text on the screen explains the characteristics of each template and the user can view a dynamic demonstration of each template or static screen shots for each type of template by selecting an appropriate button. Once a template is selected and saved, the user proceeds to the details tab 20 screen as illustrated in FIG. 4. The artist name and V-Album title fields (2010, 2011) are automatically filled in, and the user inputs a copyright year 2012 and album art file 2013. The selected template is shown as Template 1 and there is a button labeled "change template" which allows the user to change the template selection. At the bottom of the screen is an icon that indicates that the details section is "in progress." Also shown is a check box 2016 which allows the user to indicate that the section is complete. As explained below, while the V-Album can be previewed while some or all of the sections are in progress, each mandatory section preferably must be completed before publication.

Finally, FIG. 4 shows a preview button 2017. As explained below, a feature of various embodiments of the present invention is the ability of a user to compile and execute with the VAC program a V-Album for which only a subset of the information required for publication is included, with the VAC program providing default data for the missing information. In the embodiment illustrated in the Figures, this is implemented by selecting the preview button 2017. In this example, provided that the user has input at least the artist name, album title, and template, the VAC program will compile and execute a V-Album providing default data for the missing information. If, for example, the user added the album art 2013 image, and then selected the preview button 2017, the VAC program will compile and execute a V-Album according to the selected template which includes artist name, album title, and the album art image, and providing default data for the remaining missing information.

Figure 5:
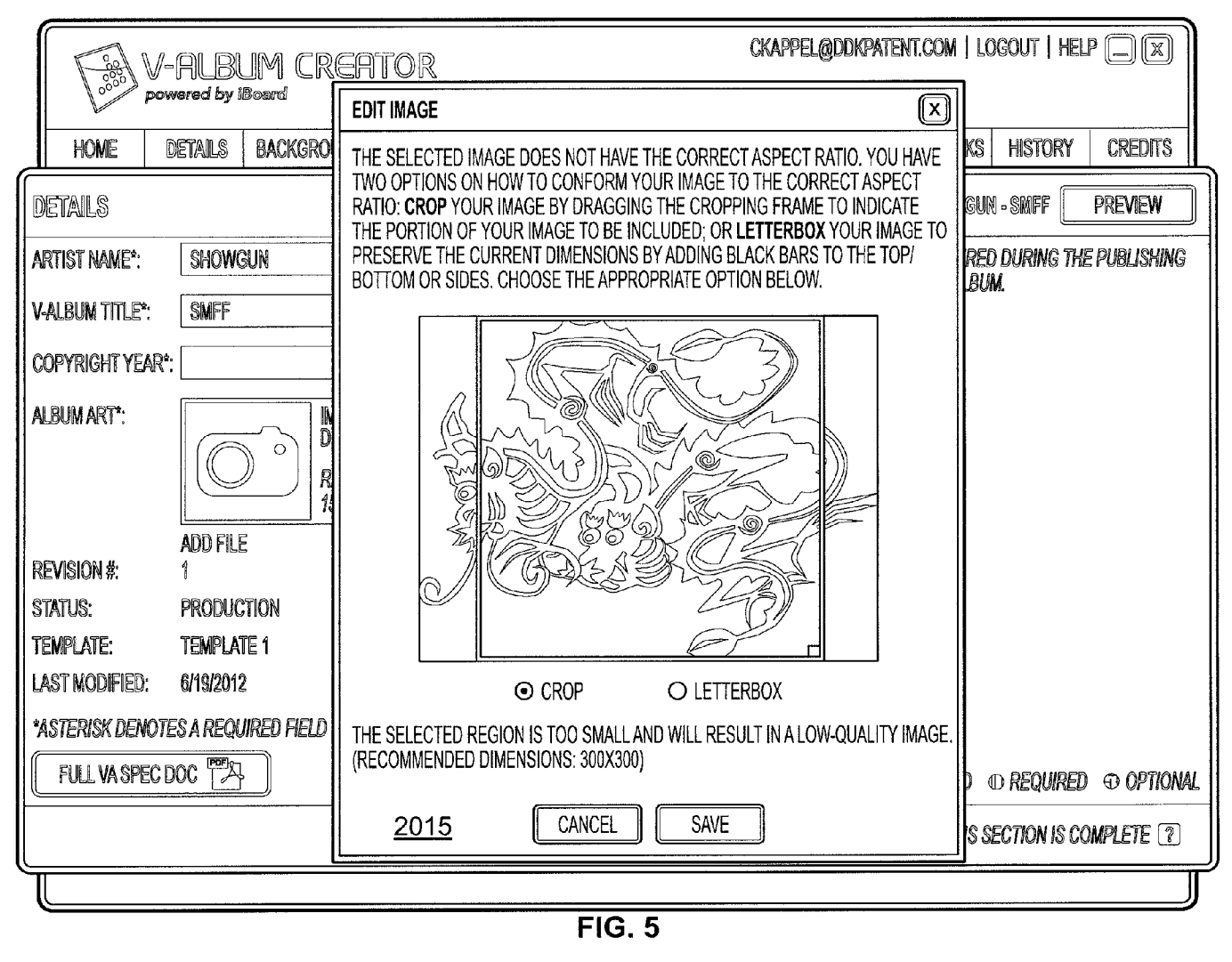
Figure 6:
FIG. 6 shows the details tab screen with a letter box image added to the album art field.

Another feature of various embodiments of the present invention is that the software evaluates the images and data input by the user to determine if it conforms to specifications and notifies the user that it is not in compliance. For example, the system may evaluate images for size and resolution, and will notify the user if the image is not in compliance. Further, the system may provide the user with on-screen instructions for bringing the image into compliance. Finally, depending on system design, the system may reject data that is out of compliance, or may simply warn the user that the data does not meet compliance standards. FIG. 5 provides an illustration of this feature. In this example, the user has added an image for the album art by selecting the add file link 2014 in FIG. 4. The VAC program analyzes the image and determined that the image did not have the correct aspect ratio, and displays an edit image screen 2015 as shown in FIG. 5. The screen 2015 provides the user with two options to correct the aspect ratio: (i) cropping the image or (ii) displaying the entire image and providing background filler around the image to provide the correct aspect ratio (letter box). In this case, the user has selected the "crop" option. However, the VAC program reports that the cropped image is too small, and therefore, it will provide a low quality image because of poor resolution. This information is relayed to the user on the screen 2015 along with the recommendation that the source image should have dimensions of at least 300×300 pixels in order to provide a quality image. In this example, the user has chosen to instead use the letterbox option, and in FIG. 6, the image 2018 is shown with black bars on the top and bottom to provide the required aspect ratio and 300×300 pixels.

Figure 7A:
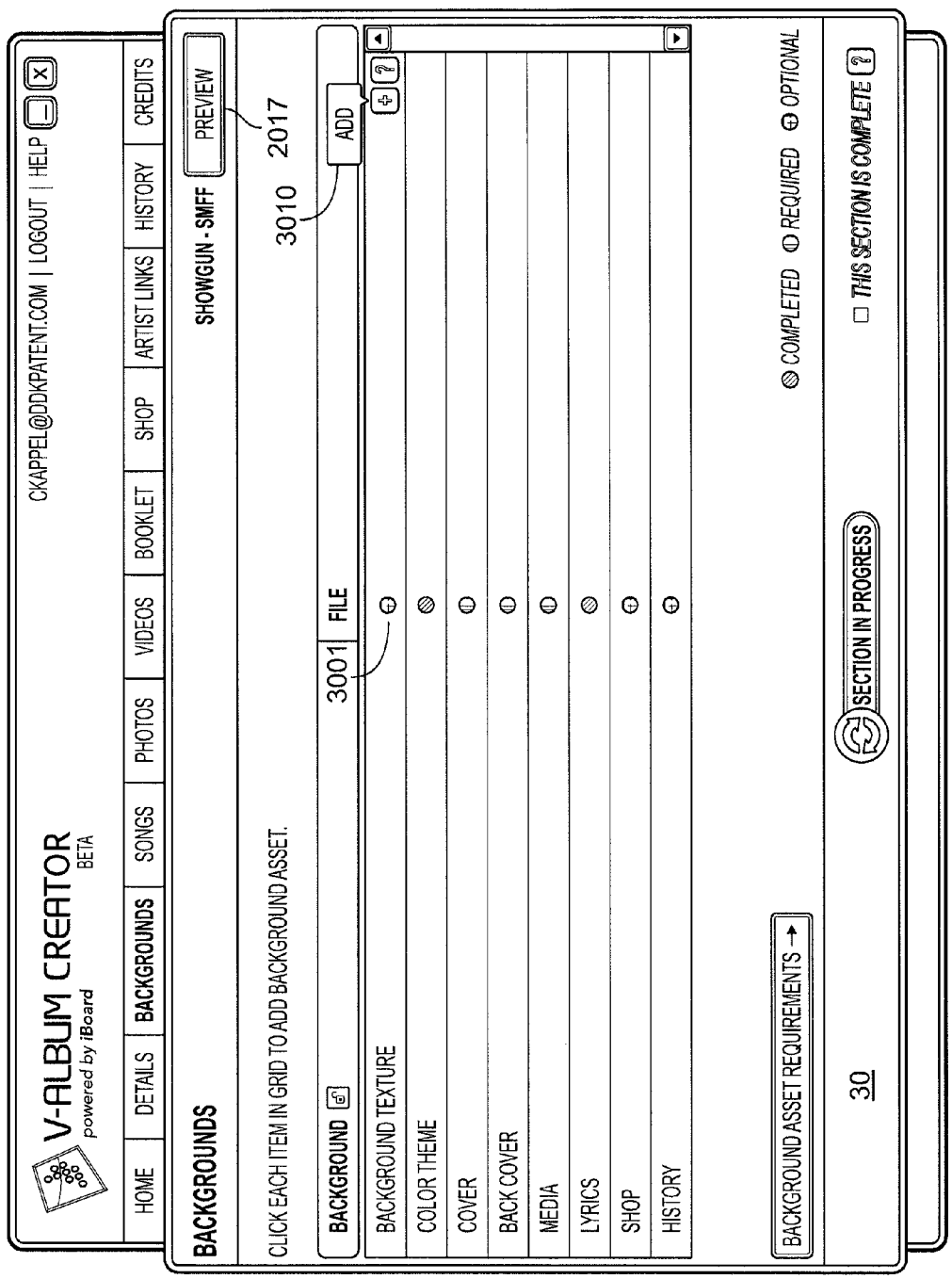
FIG. 7A shows an exemplary graphical user interface showing a backgrounds tab screen
Figure 7B:
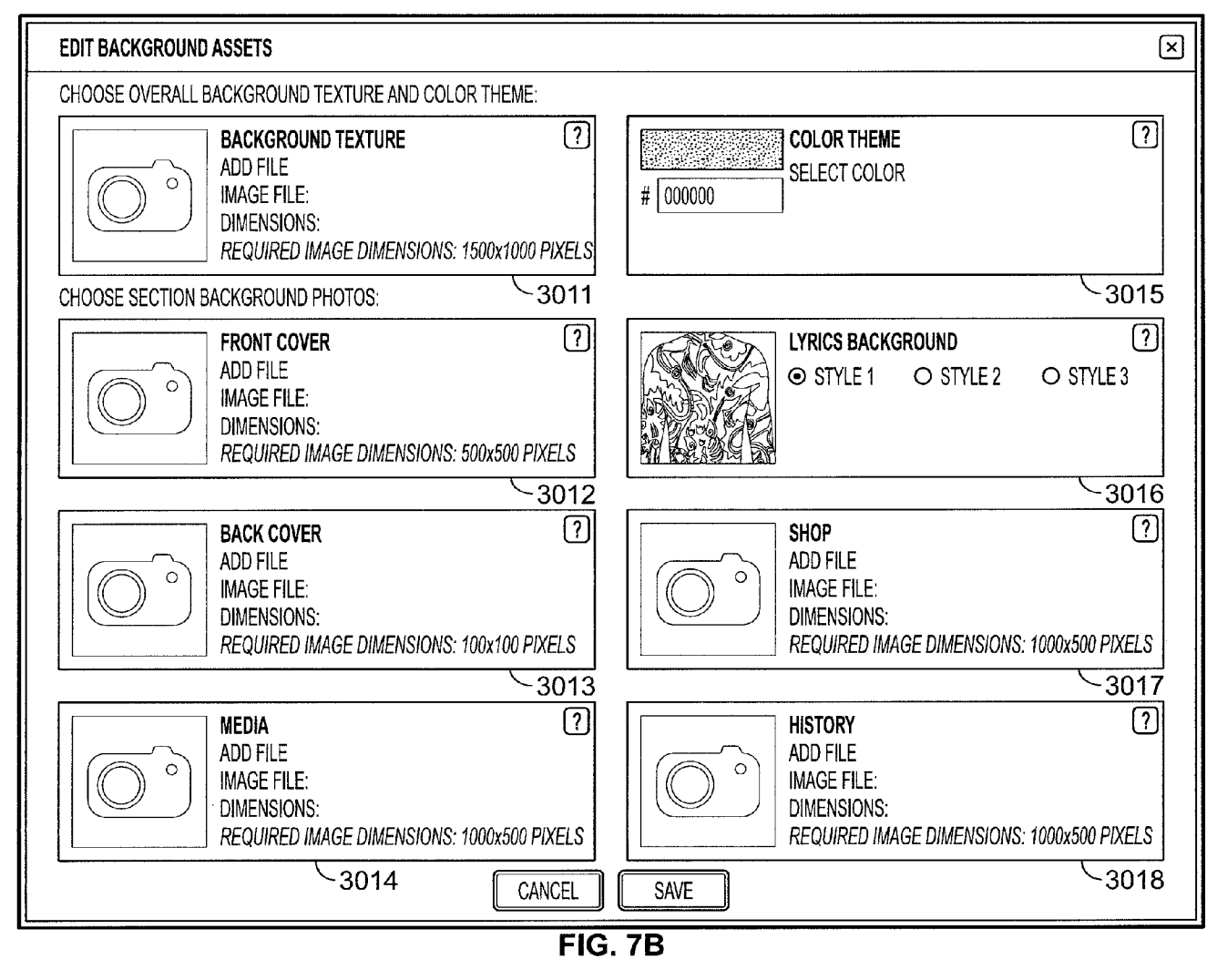
Figure 7C:
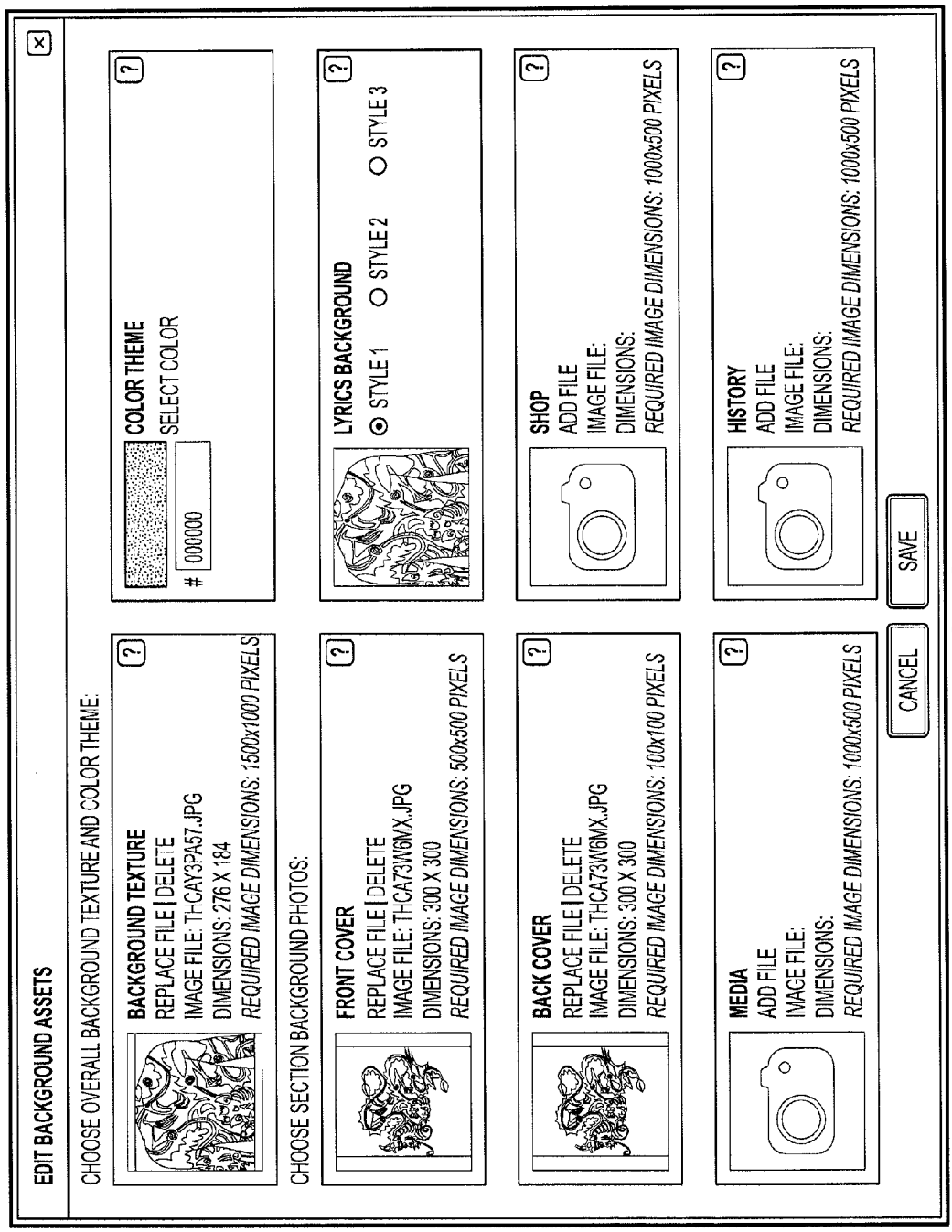

After the copyright year and album art image have been added by the user on the details tab screen, the user proceeds to the backgrounds tab 30 screen, illustrated in FIG. 7. As shown in FIG. 7A, the user selects background texture, color theme, a cover image, a back cover image, a media image, a shop image, a history image, and a lyrics texture. An indicator 3001 indicates to the user by the color of the circle whether he or she has already input the required image, texture, or color theme. Upon selecting the add button 3010, an edit background assets screen (FIG. 7B) is displayed which allows the user to add a background texture image 3011 which will be displayed as a background texture for the V-Album, a front cover image 3012 which will be displayed as the front cover for the V-Album, a back cover image 3014 which will be displayed as the back cover of the V-Album, a shop image 3017 which will be displayed as background on the shopping page of the V-Album, and a history image 3018 which will be displayed as background on the history page of the V-Album. The user also selects a background texture style for displaying the lyrics 3016, and a color theme 3015 for the V-Album. FIG. 7C illustrates the edit background assets screen of FIG. 7B with a background texture image, a front cover image, a back cover image, a color theme, and a lyrics background entered. Upon selecting save, the user is returned to the screen of FIG. 7A. At this point, if the user were to select the preview button 2017 shown in FIG. 7A, the VAC program will compile and execute a V-Album according to the selected template which includes artist name, album title, copyright, the album art image, background texture, front cover, back cover, color theme, and lyrics background input by the user, and providing default data for the remaining missing information.

Figure 7D:
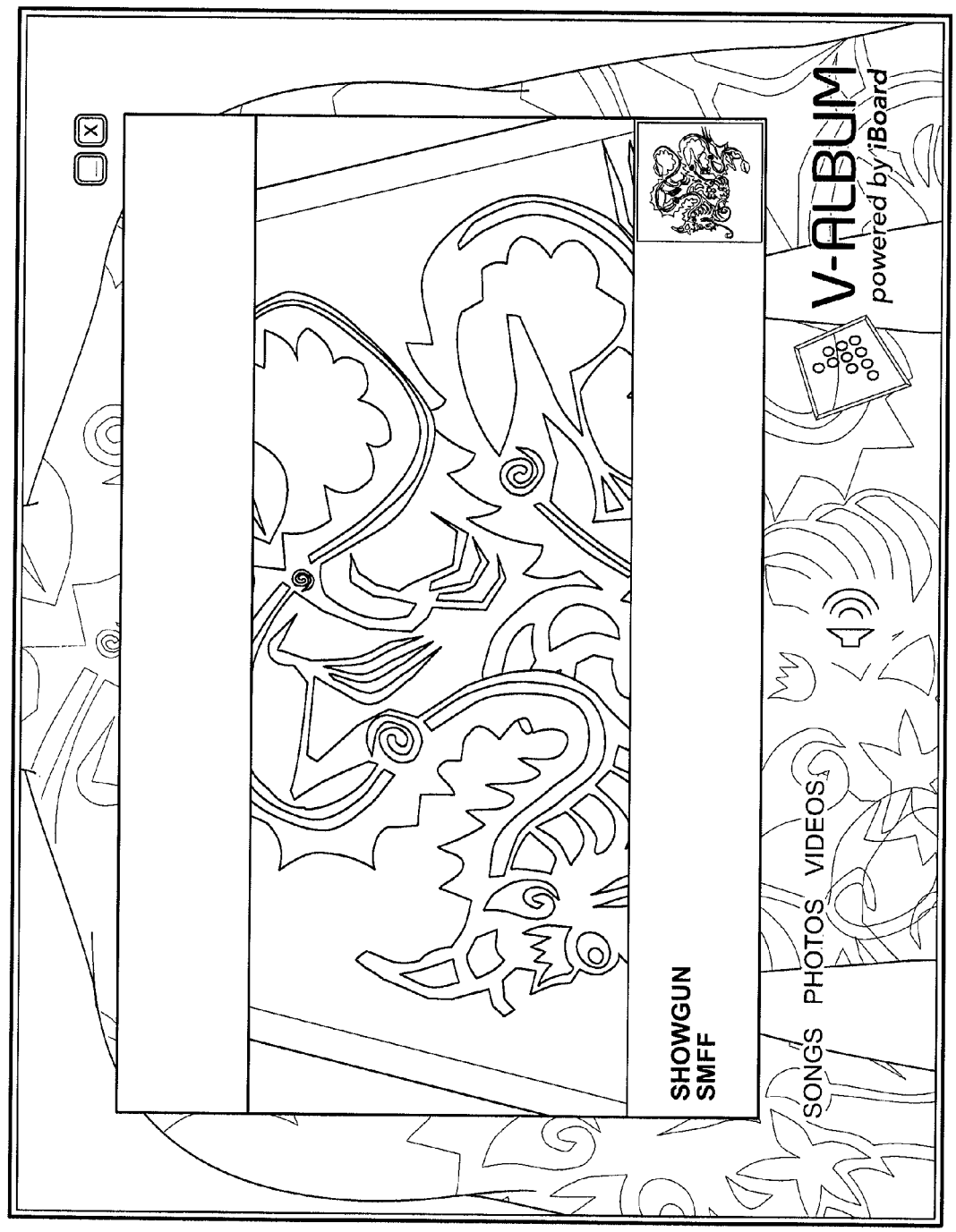
FIG. 7D illustrates an exemplary template 2.
Figure 9A:
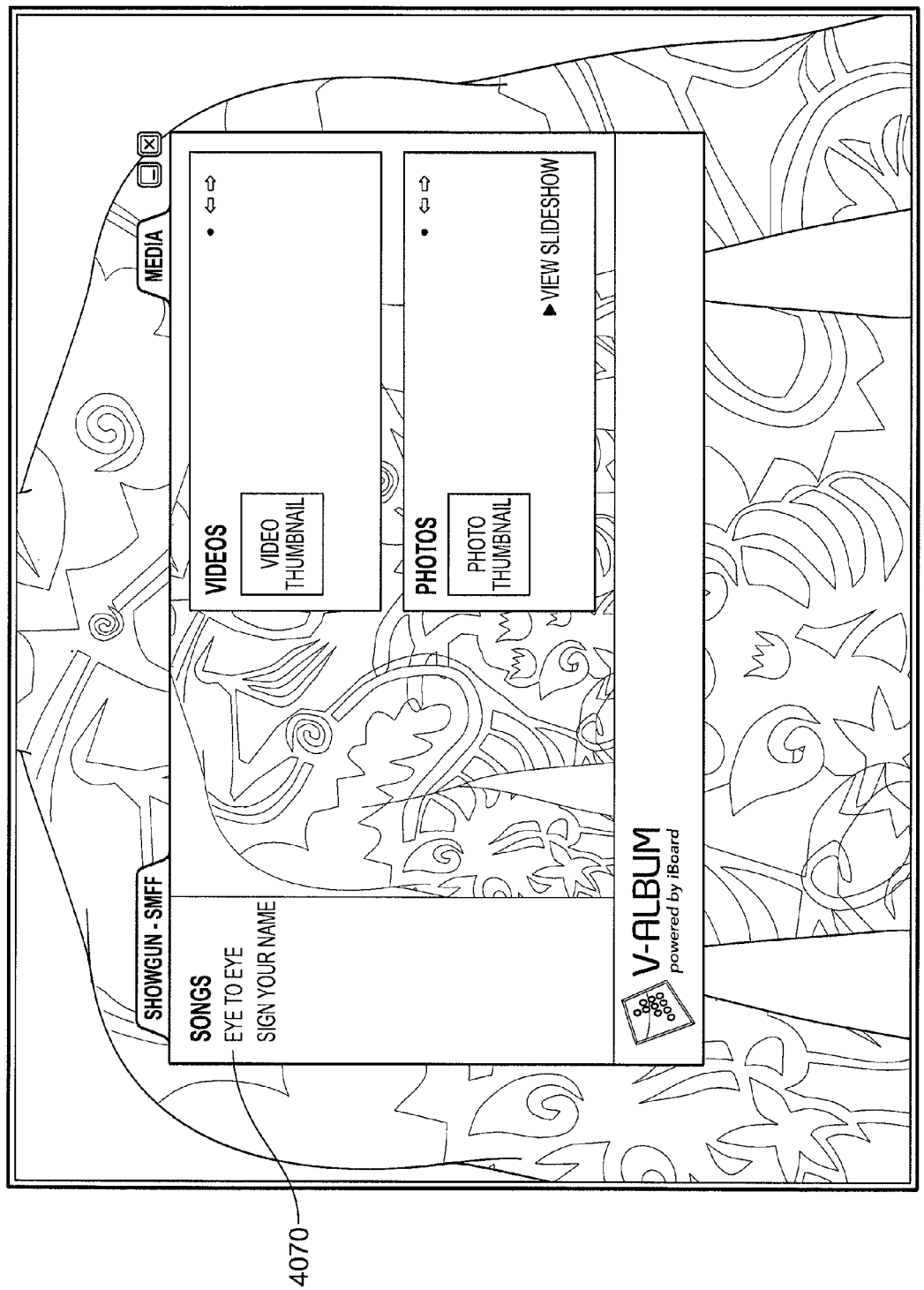
FIG. 9A shows an interior album display produced by selecting the preview button on FIG. 8C.
Figure 9B:
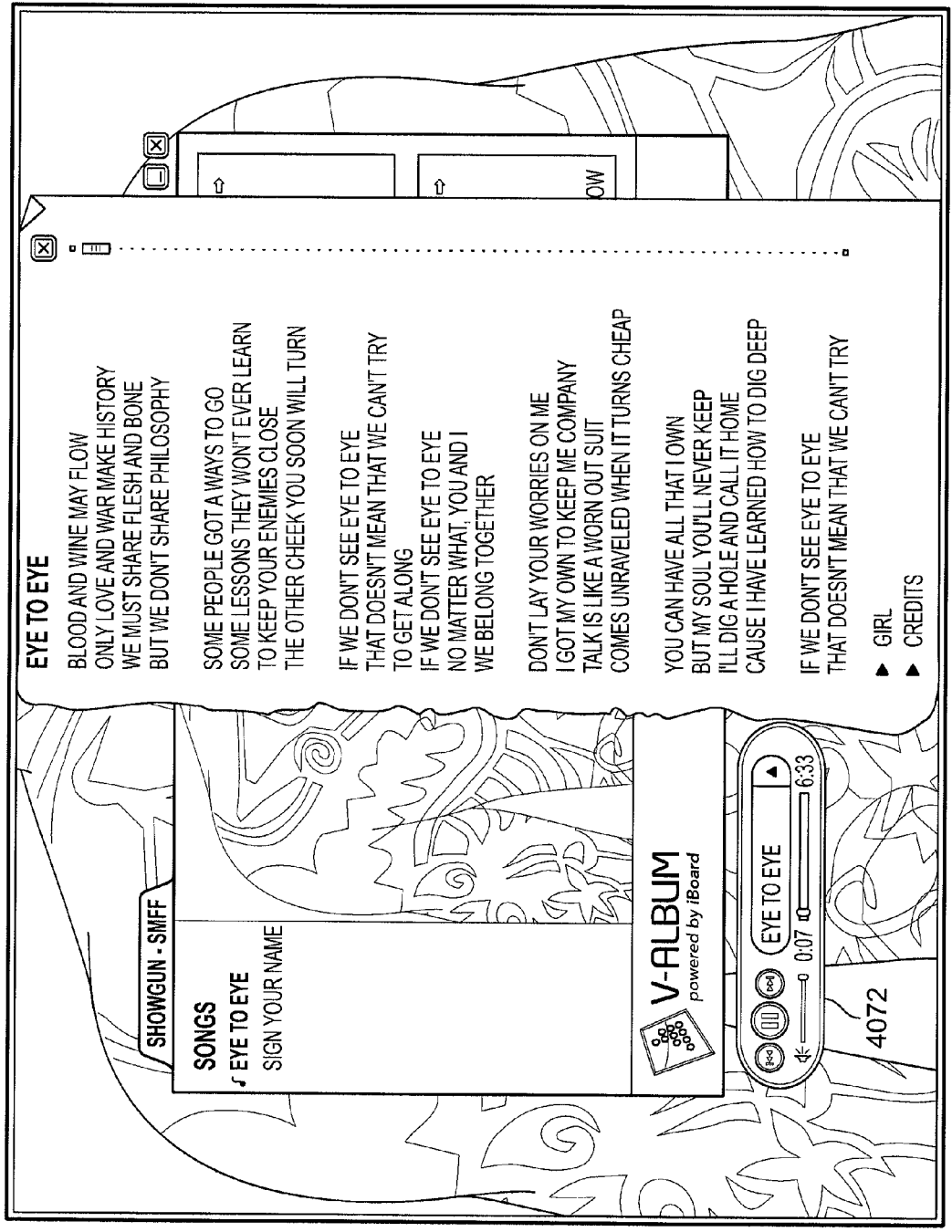
FIG. 9B shows the display of FIG. 9A after the link for the song "Eye to Eye" is selected.
Figure 9C:
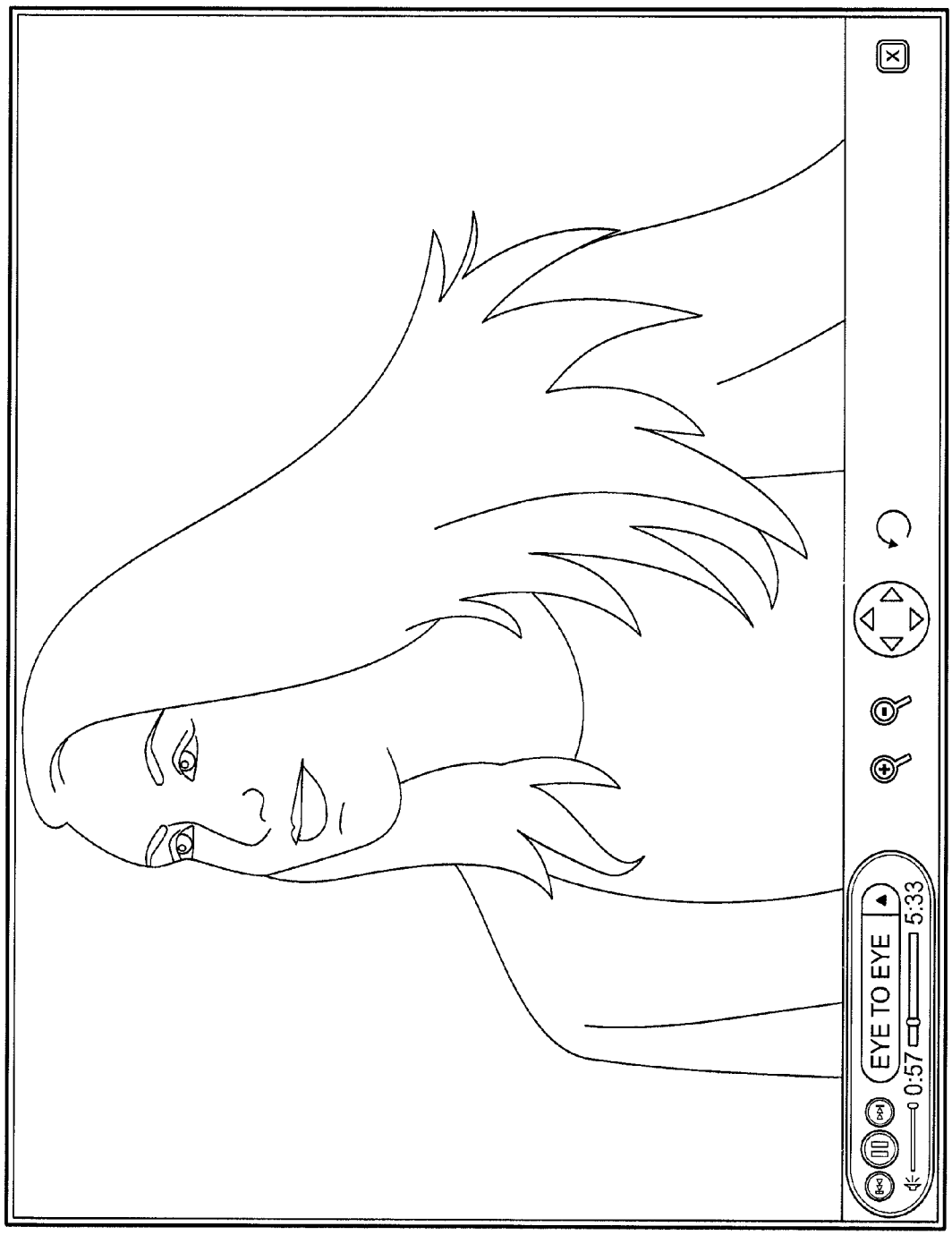
FIG. 9C shows the display of FIG. 9B after the link for the photo labeled "girl" is selected.

For example, if Template 1 was selected, the preview would show the background texture image in the background of the screen, then show the front cover image, and then show the interior of the album (see, for example FIG. 9A) with links for each song and video. Upon closing the V-Album (for example, by selecting the X icon on the upper right of the display, as shown in FIG. 9A), the album will close and the back cover image will be displayed. If Template 2 was selected, the preview would show the background texture image in the background of the screen, then and then show the front cover image, and provide navigation links for the songs, photos, videos, album cover and album credits, as illustrated in FIG. 7D.

Figure 8A:
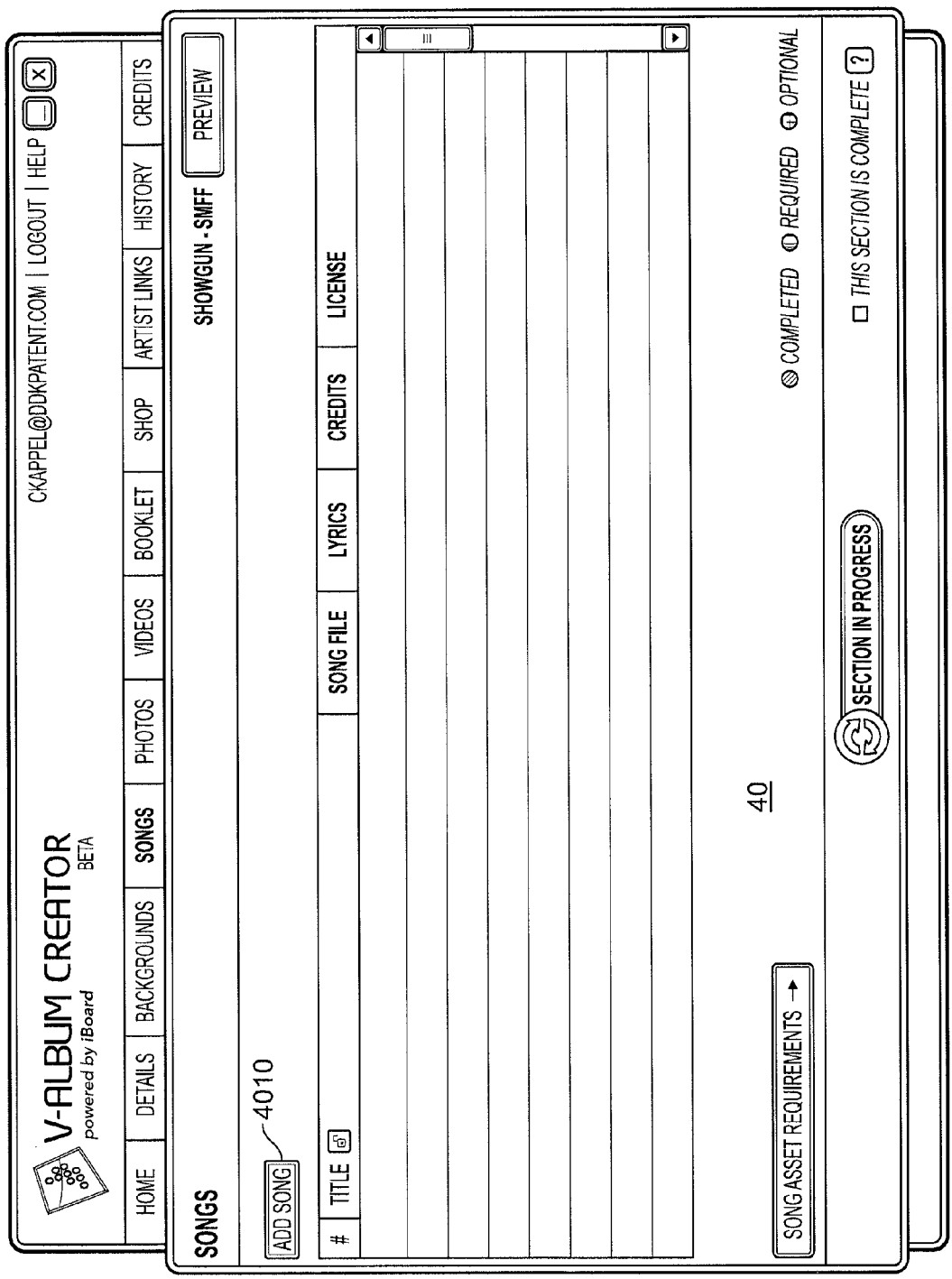
FIG. 8A shows an exemplary graphical user interface showing a songs tab screen.

In any event, after the information is input (in whole, or in part, or not at all) into background tab screen, the user proceeds to the songs tab 40 screen, which is illustrated in FIG. 8A. The user adds a song by selecting the add song button 4010, which causes the add song pop up screen 4001 to appear as shown in FIG. 8B. On screen 4001, the user enters the song title 4011 (required), IRC code 4012, song audio file 4013, lyrics 4014, and credits 4015. If the user wishes to include an image associated with the song, there is a checkbox 4017, and the user can add a label to be displayed with the image and an image. The user also selects a license option, either original or public domain song 4020 or cover song 4021, which is preferably a required selection as indicated by the asterisk. The software also provides information regarding each option upon selection of the question mark buttons. The user can then select (i) add another 4023 which will save the information and open a new add song screen 4001, (ii) done 4024 which will save the information and return to the screen of songs tab 40 screen, or (iii) cancel 4022, which will return to the song tab 40 screen without saving the information. FIG. 8C shows the songs tab 40 screen with two songs entered. At this point, if the user were to select the preview button 2017 shown in FIG. 7A, the VAC program will compile and execute a V-Album according to the selected template which includes artist name, album title, copyright, the album art image, background texture, front cover, back cover, color theme, lyrics background, songs, photos and lyrics input by the user, and providing default data for the remaining missing information. For example, if the "eye to eye" song audio file was added, and the preview button pushed, the compiled V-Album would include that audio file, and the user could play the song in the same manner that he or she would in a completed V-Album. If the preview button was selected before the "Eye to Eye" song audio file was added, default music would play instead.

Figure 9D:
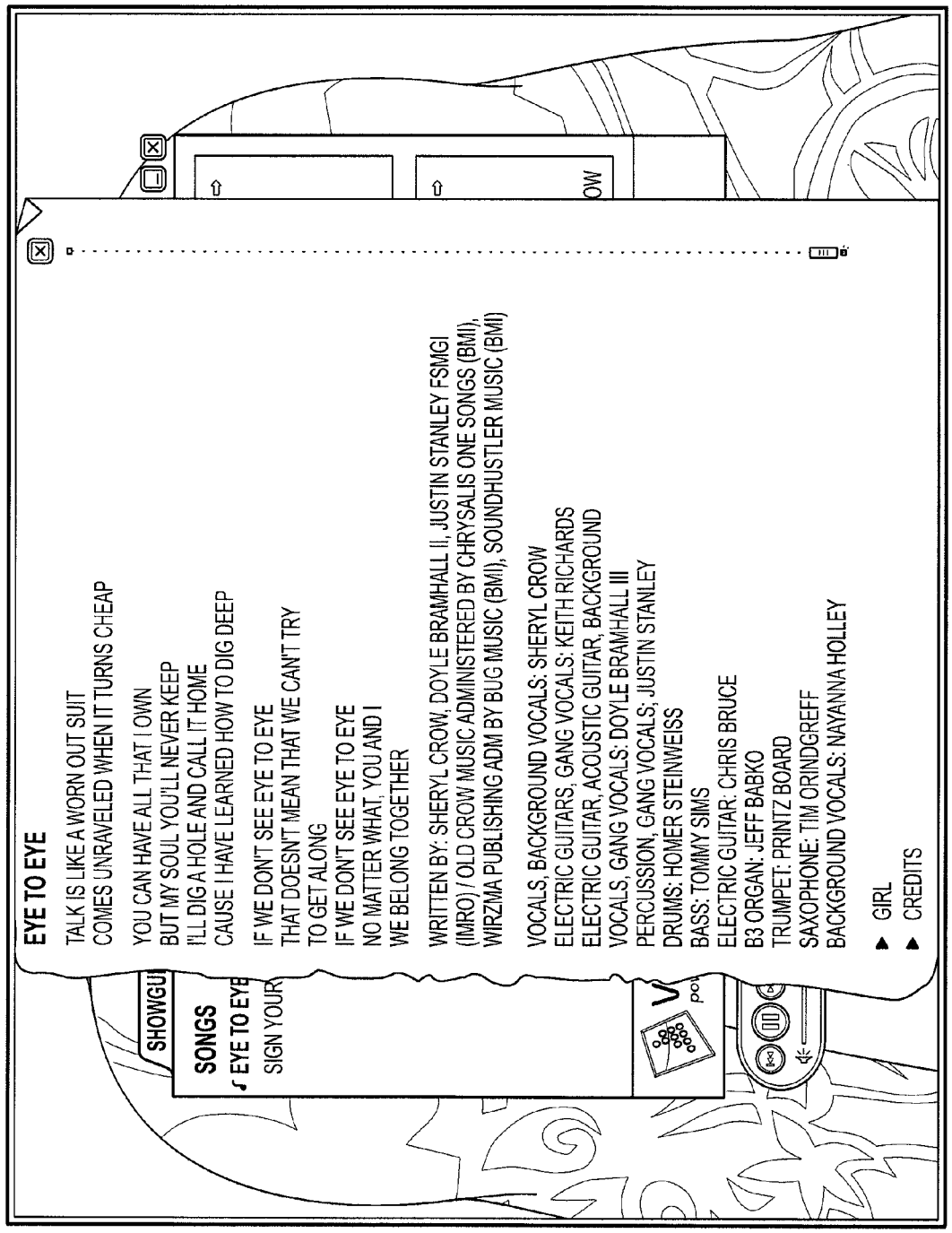
FIG. 9D shows the display of FIG. 9B after the credits link is selected.

FIGS. 9A-E show screen shots that would be displayed if the preview button 2017 was selected from FIG. 8C. First, the background texture image 3011 would be displayed, followed by the front cover image 3012. The GUI would then show the V-Album opening to display an album interior as shown in FIG. 9A, with the artist name, album name, copyright, and song names displayed. Since no videos or slideshow photos have been input yet, there are default images shown. Upon selecting the "eye to eye" song link 4070 in FIG. 9A, the software displays the screen shown in FIG. 9B, plays the audio file and shows the lyrics 4014 (FIG. 8B) on the selected lyrics background 3016 (FIG. 7B). Selecting the "girl" link (label 4018, FIG. 8B), displays the screen of FIG. 9C, which includes the image 4019 (FIG. 8b), and continues to play the song. Also included is a song navigation interface 4072, which allows the song to be played, paused, fast forward, fast reverse, and to allow the volume to change. Turning to FIG. 9D, selecting the credits link causes the song credits (4015, FIG. 8B) to be displayed.

Figure 9E:
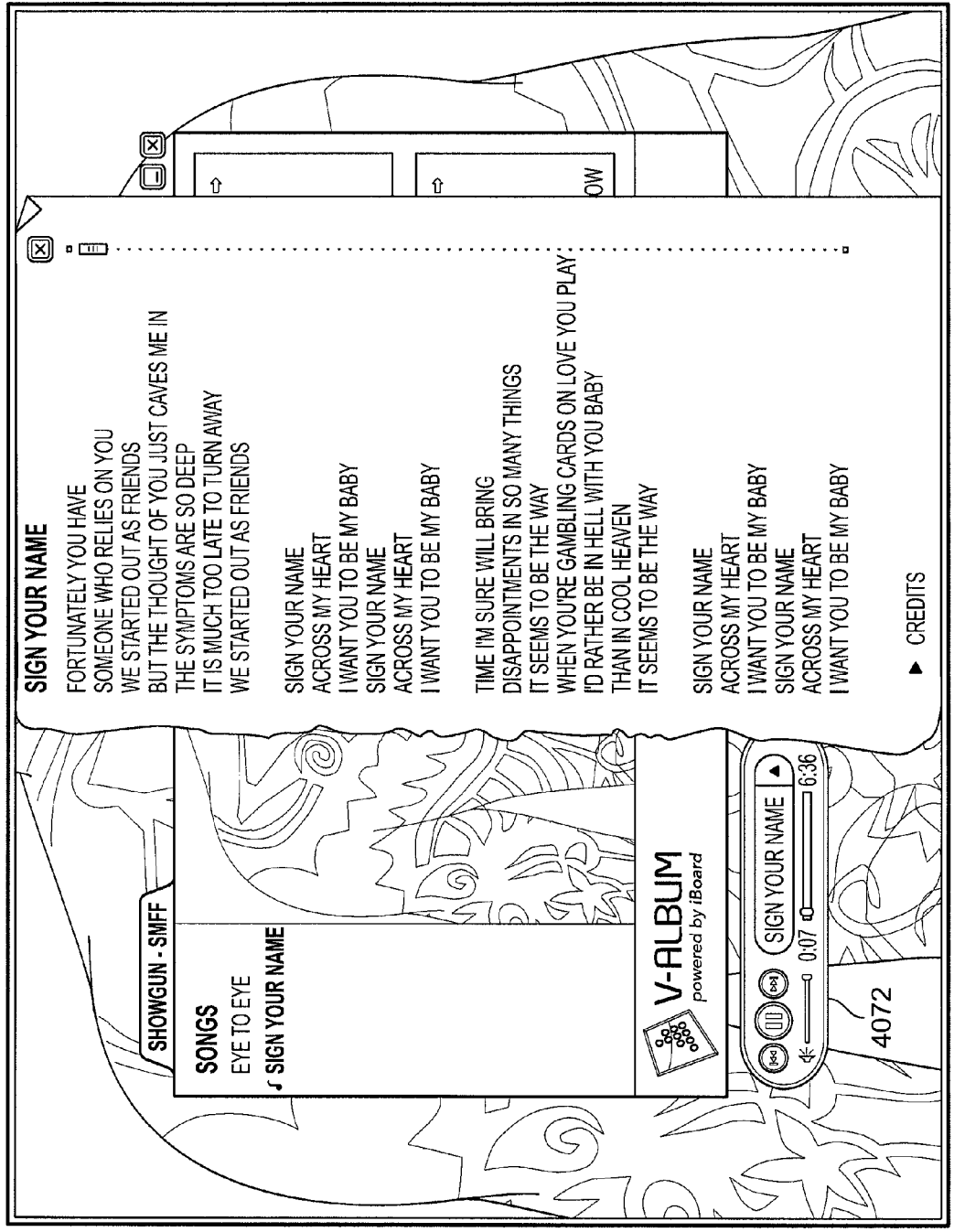
FIG. 9E shows the display of FIG. 9A after the link for the song "Sign Your Name" is selected.

FIG. 9E illustrates the treatment of optional data. Referring back to FIG. 8B, for the song "sign your name", the user did not check the image content box 4017. As a consequence, there is no default photo link shown on the lyrics page in FIG. 9E.

Figure 10A:
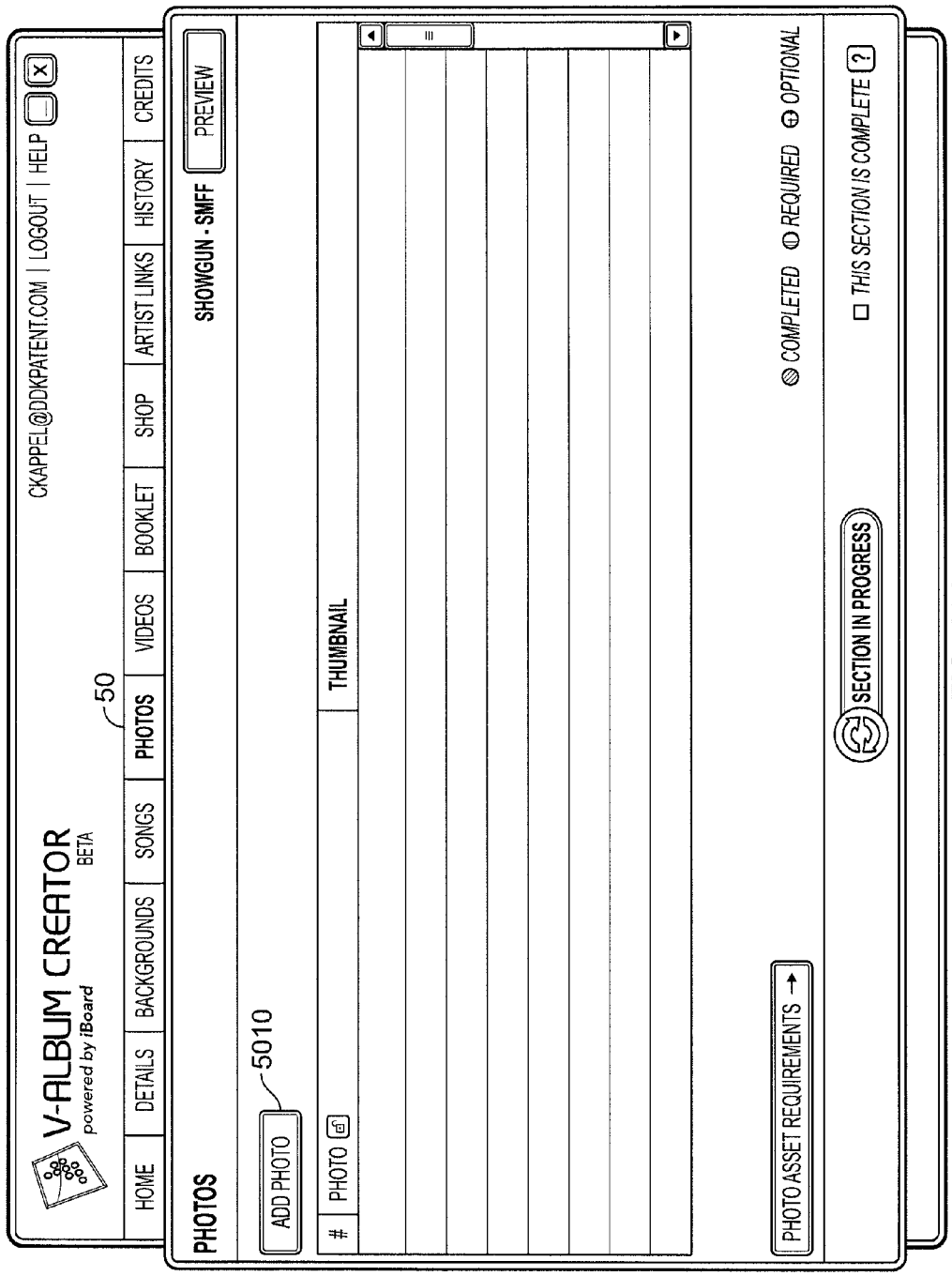
FIG. 10A an exemplary graphical user interface showing a photos tab screen.
Figure 10B:
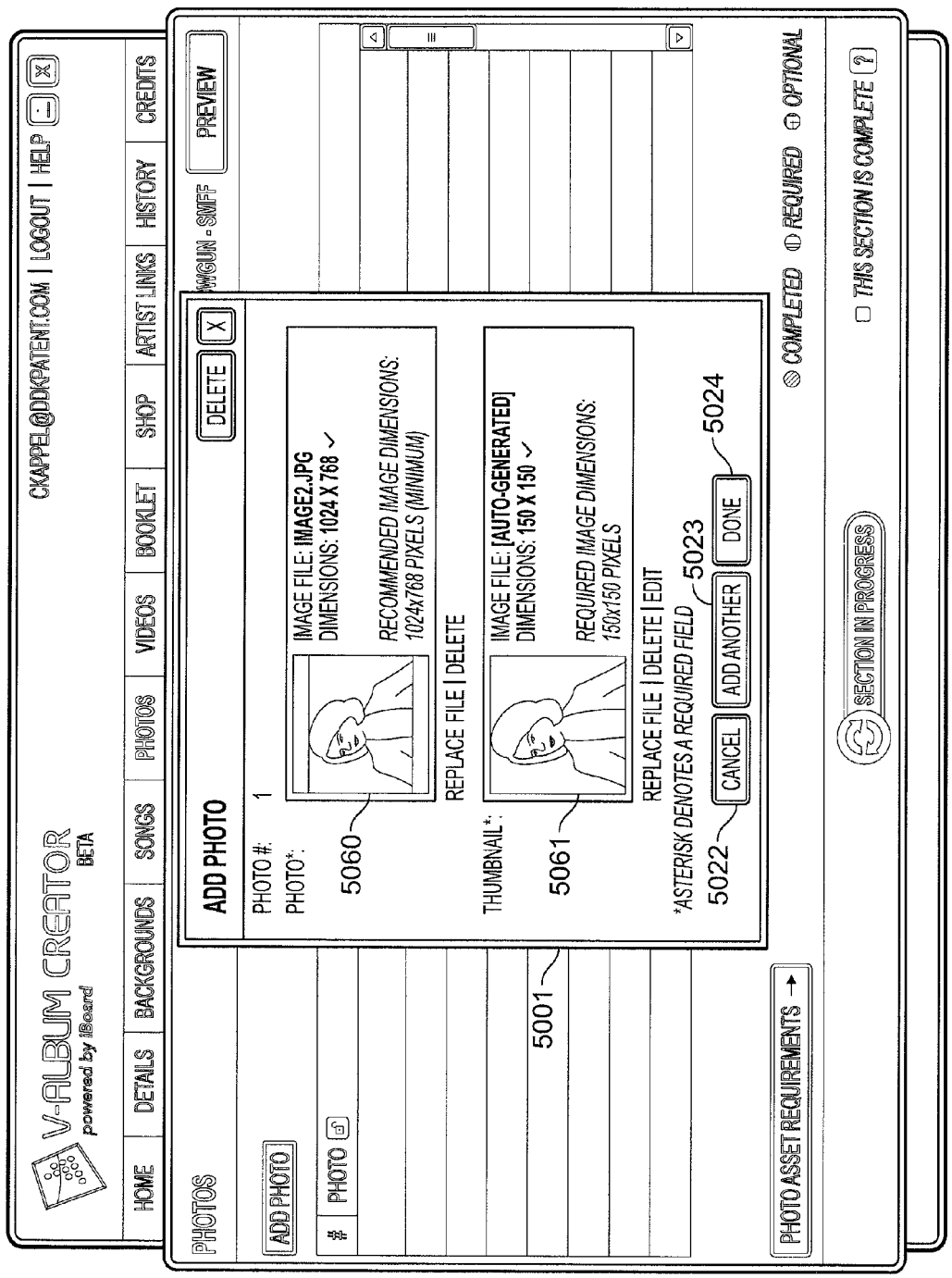
FIG. 10B shows the photos tab screen of FIG. 10A with an add photo pop up screen displayed.
Figure 10C:
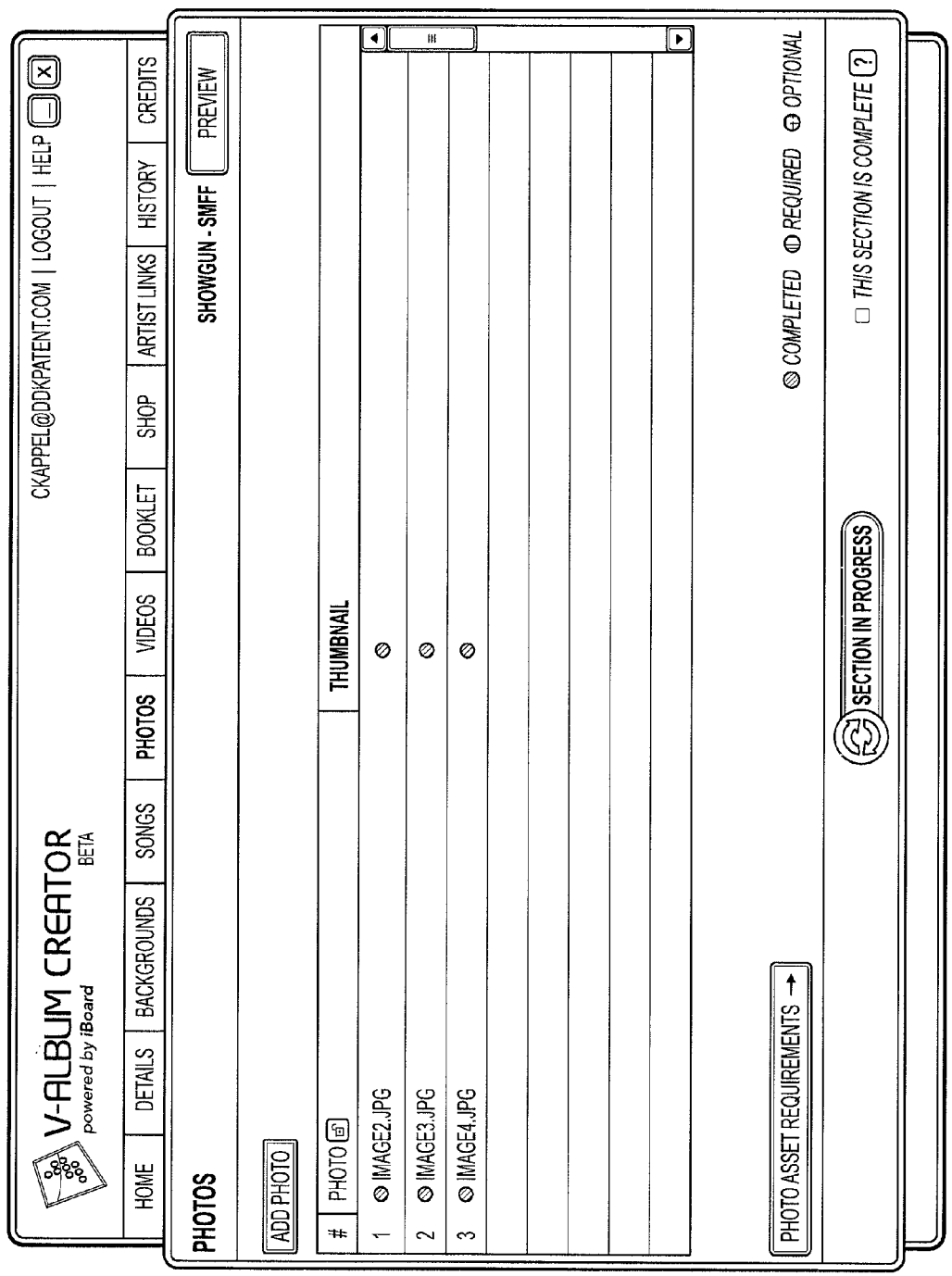
FIG. 10C shows the photos tab screen of FIG. 10A with three photos added.
Figure 10D:
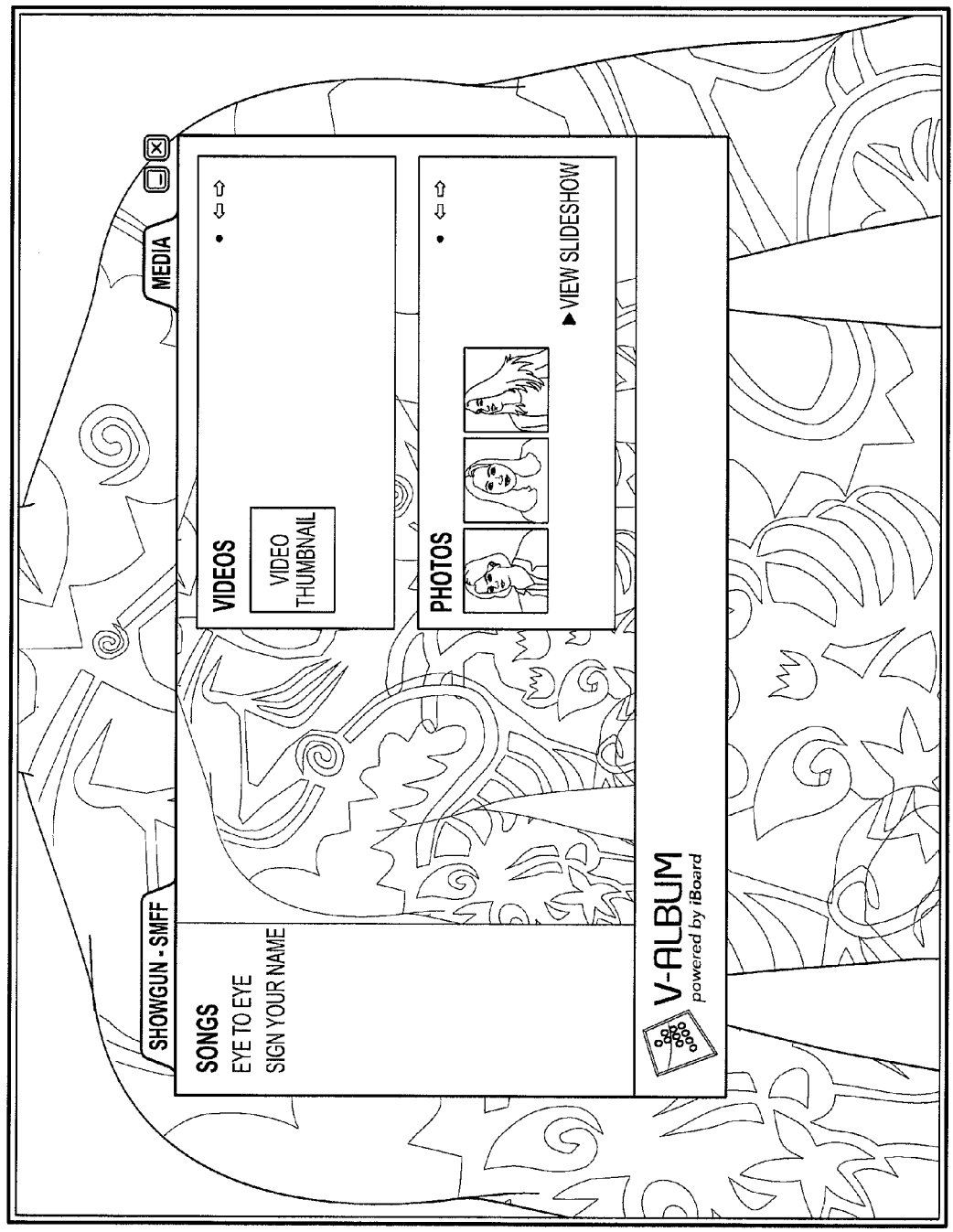
FIG. 10D shows an interior album display produced by selecting the preview button on FIG. 10C.

FIGS. 10A-10D illustrate the next tab, the photos tab 50. In FIG. 10A, the photos tab 50 screen is shown. As there were no slide show photos previously added (See FIG. 9A), there are no photos listed. To add a photo, the user selects the photo button 5010, causing the software to display FIG. 10B. FIG. 10B shows an image 5060, which has been added as photo #1. The software automatically generates the thumbnail image 5061. As with prior images, the system will check the image for compliance as described previously in connection with FIG. 5. The user can then select (i) add another 5023 which will save the information and open a new add photo screen 5001, (ii) done 5024 which will save the information and return to the photo tab 50 screen, or (iii) cancel 5022, which will return to the photo tab 50 screen without saving the information. FIG. 10C shows the photo tab 50 screen with three photos added, and FIG. 10D illustrates the album interior screen of FIG. 9A, when the preview button 2017 has been selected after the photos have been added in FIG. 10C. Comparing FIG. 9A with FIG. 10C, the default photo of FIG. 9A has been replaced with three thumbnail photos 5061. Upon selecting the view slideshow link of FIG. 10D, a slideshow of the three photos 5060 will be displayed.

Figure 11A:
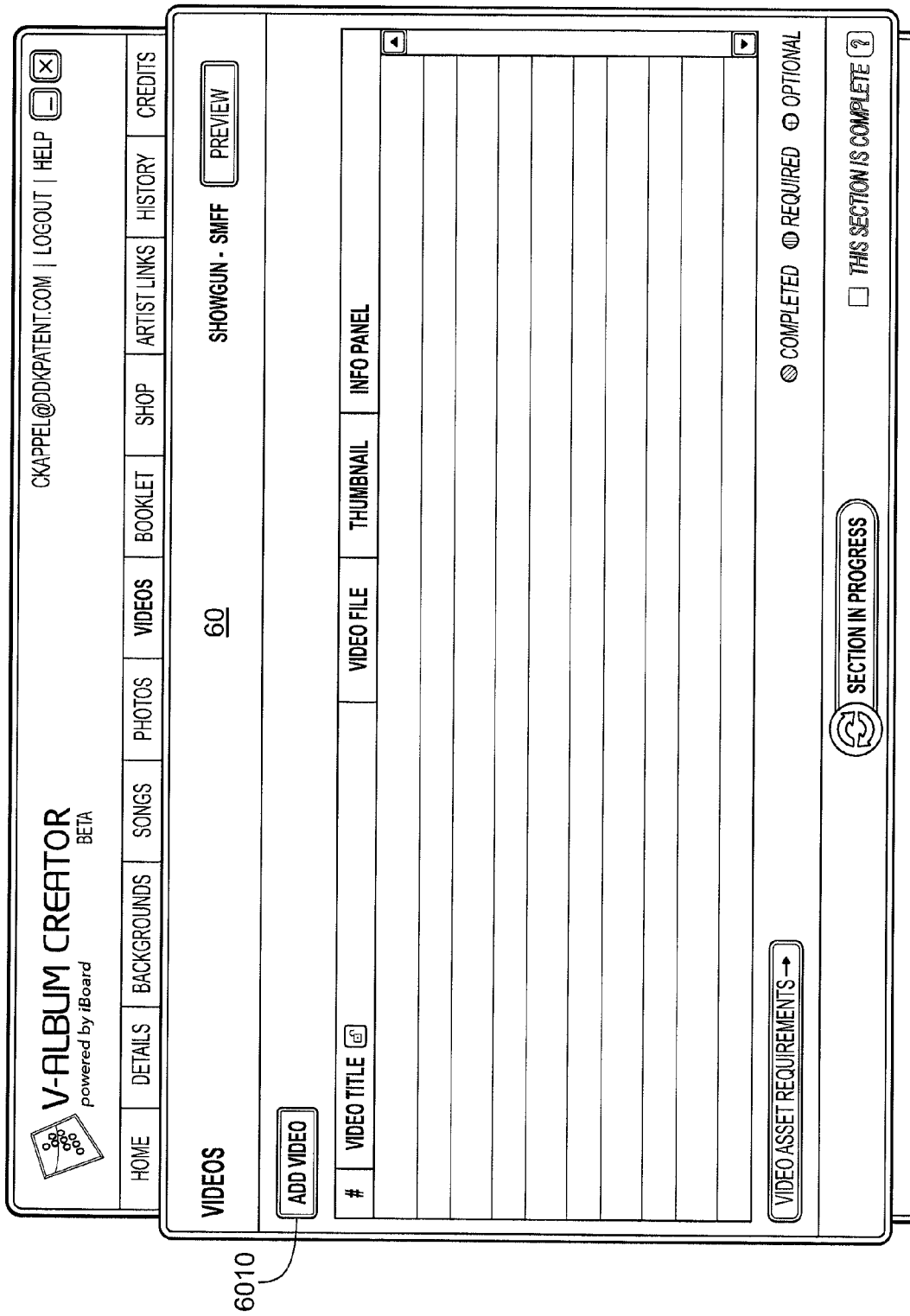
FIG. 11A an exemplary graphical user interface showing a videos tab screen.
Figure 11B:
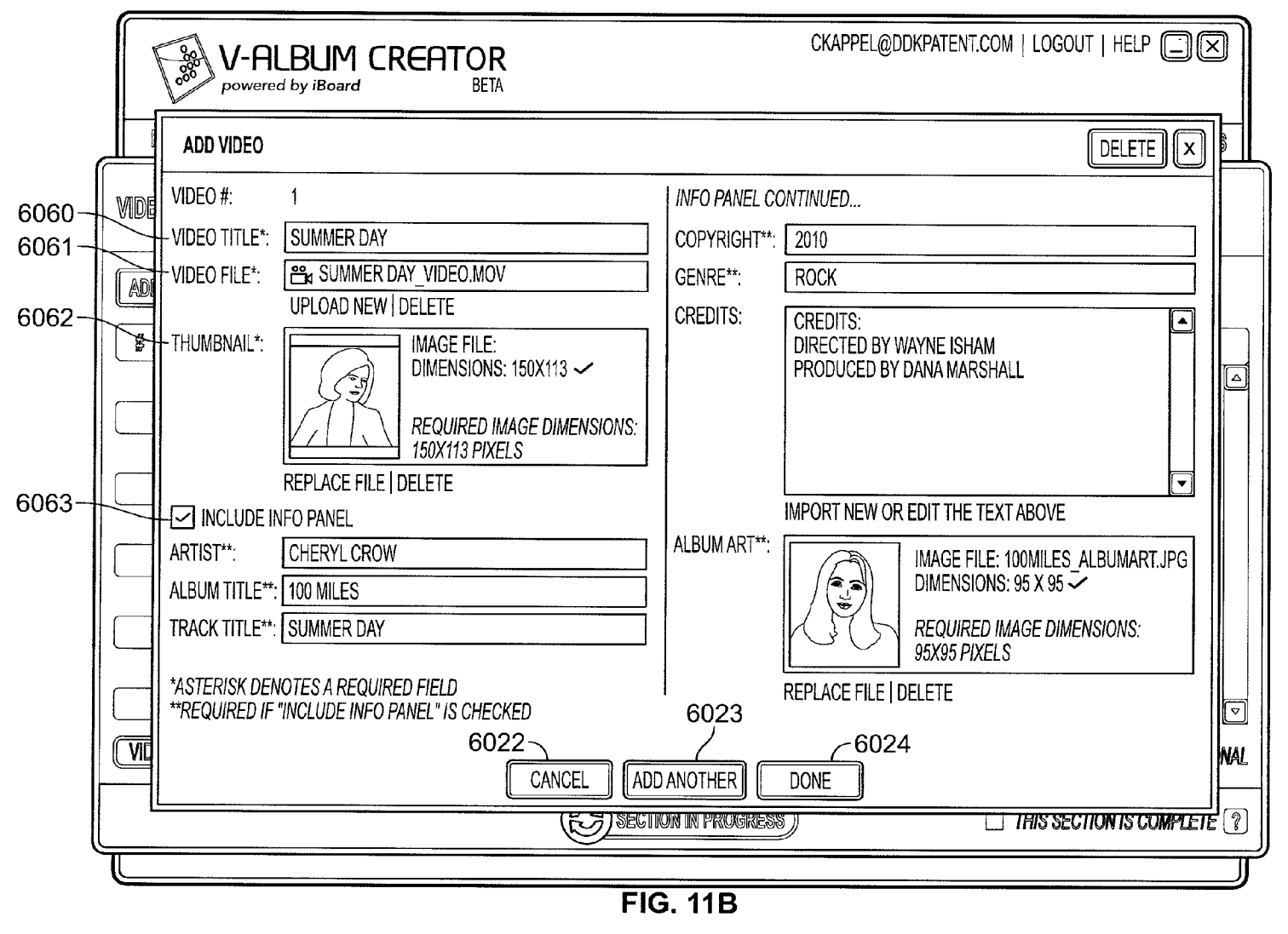
Figure 11C:
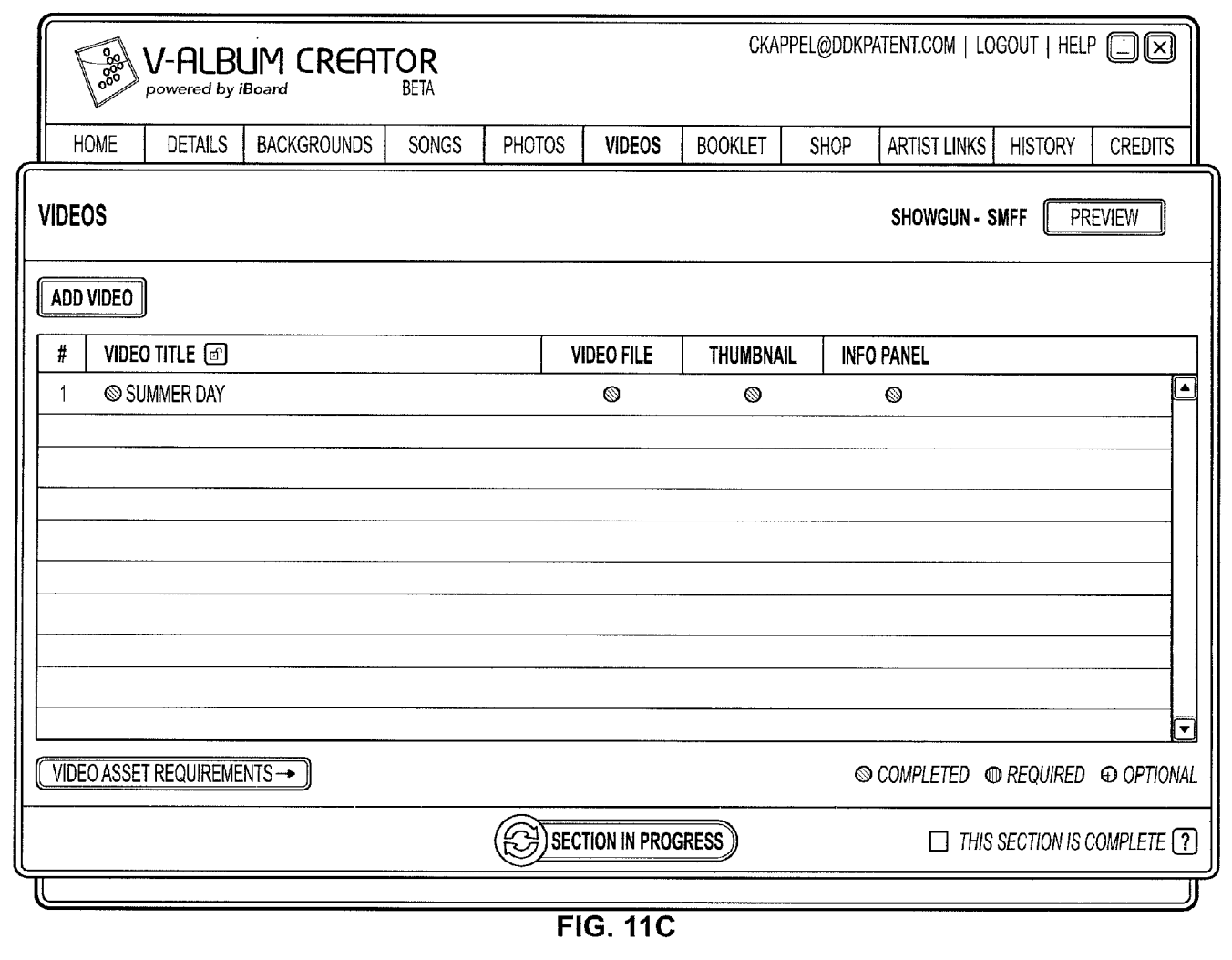
Figure 11D:
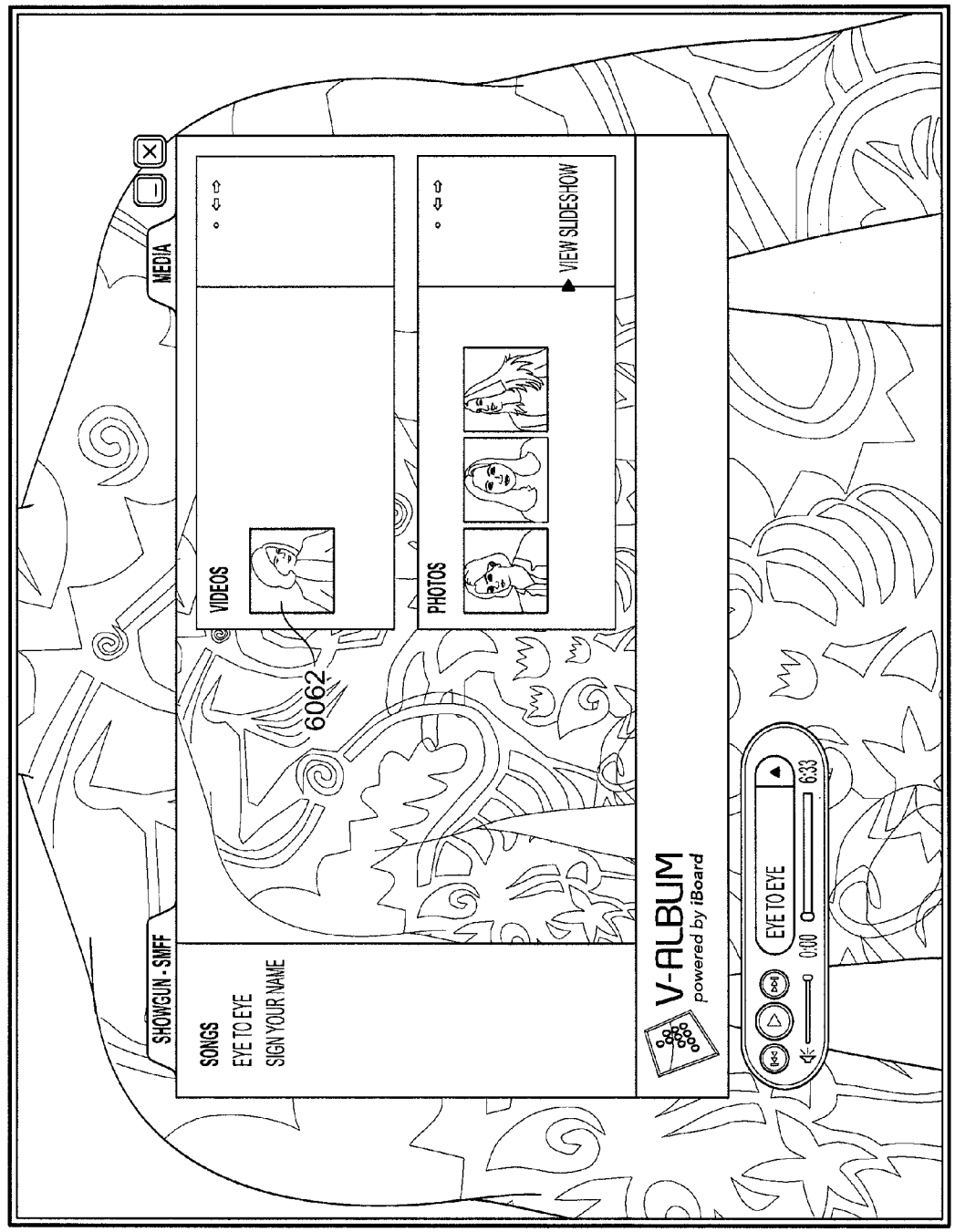
FIG. 11D shows an interior album display produced by selecting the preview button on FIG. 11C.
Figure 11E:
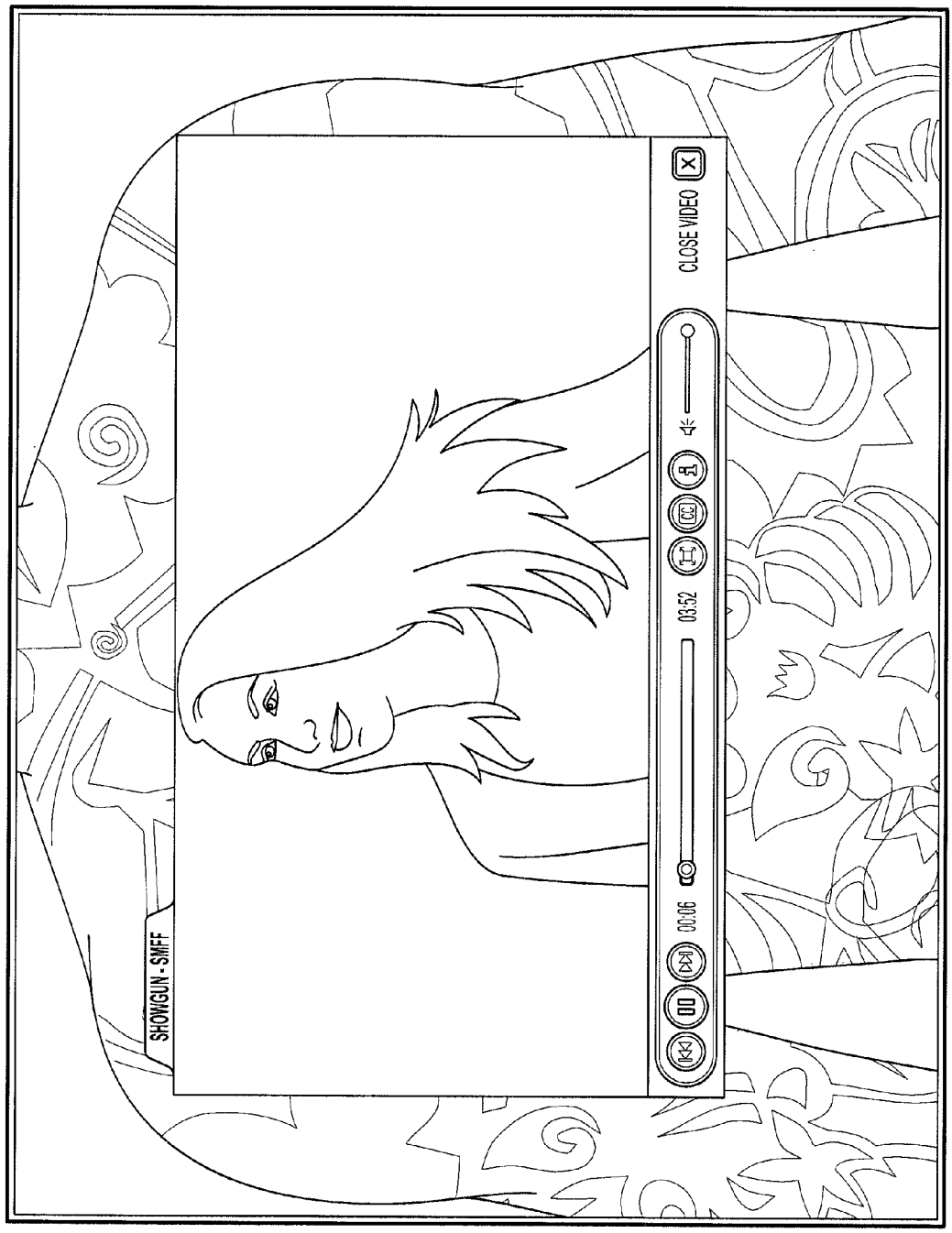
FIG. 11E shows the display of FIG. 11D after the video image is selected.

FIGS. 11A-11E illustrate the next tab, the videos tab 60. In FIG. 11A, the videos tab 60 screen is shown. As there were no videos previously added (See FIG. 10D), there are no videos listed. To add a video, the user selects the add video button 6010, causing the software to display FIG. 11B. FIG. 11B shows a video title 6060, a video file 6061, an image 6062 to be associated with the video, and an include info panel checkbox, and associated artist, album title, track title, copyright, genre, credits and album art inputs associated with the video. The user can then select (i) add another 6023 which will save the information and open a new add video screen 6001, (ii) done 6024 which will save the information and return to the videos tab 60 screen, or (iii) cancel 6022, which will return to the videos tab 60 screen without saving the information. FIG. 11C shows the videos tab 60 screen with the video of FIG. 11B added, and FIG. 11D illustrates the album interior screen of FIG. 10D, when the preview button 2017 has been selected after the video has been added in FIG. 11C. Comparing FIG. 10D with FIG. 11D, the default video of FIG. 10D has been replaced with the photo 6062 of FIG. 11B. Upon selecting the photo 6062 in FIG. 11D, the video 6061 will be played as shown in FIG. 11E.

Figure 12A:
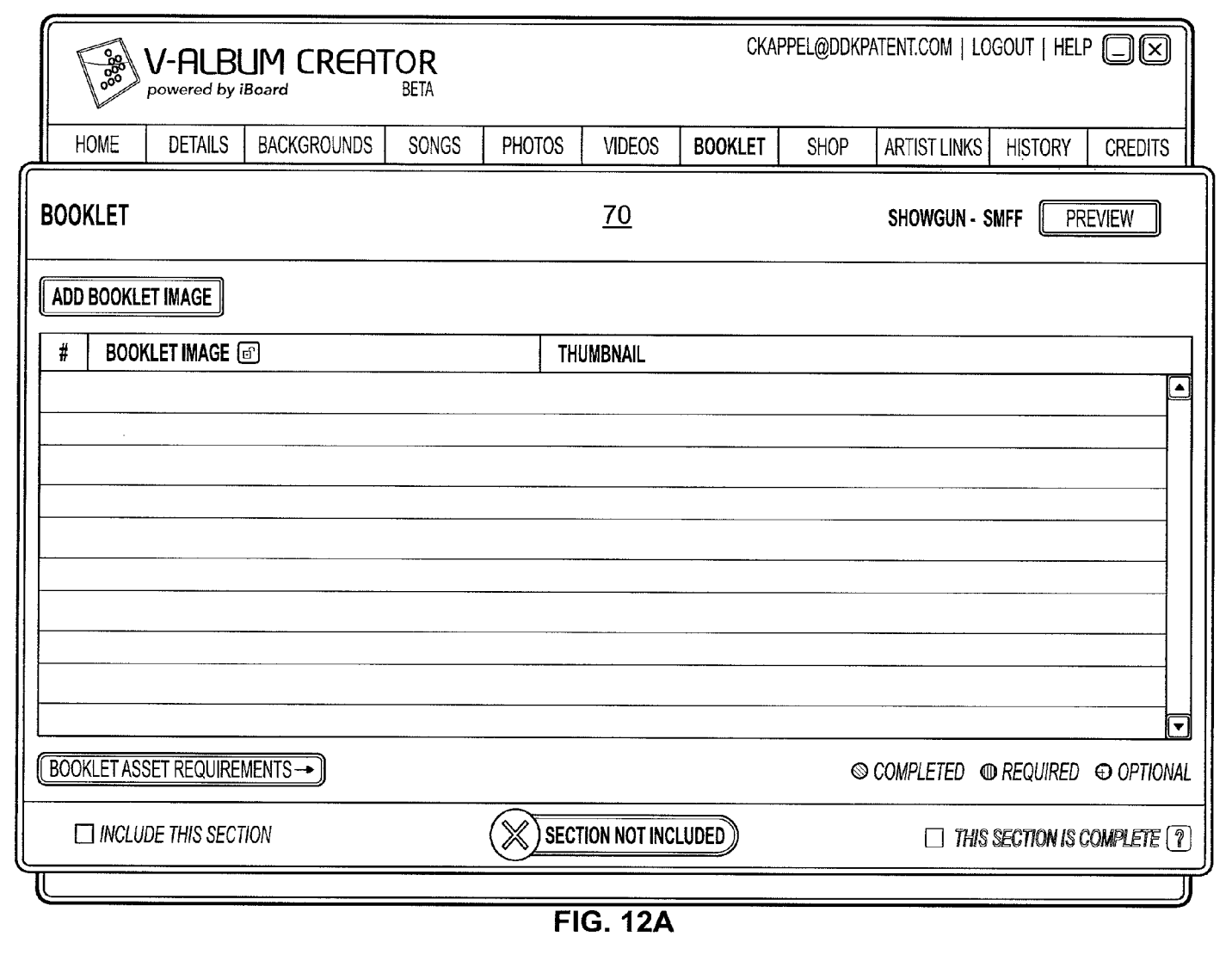
Figure 12B:
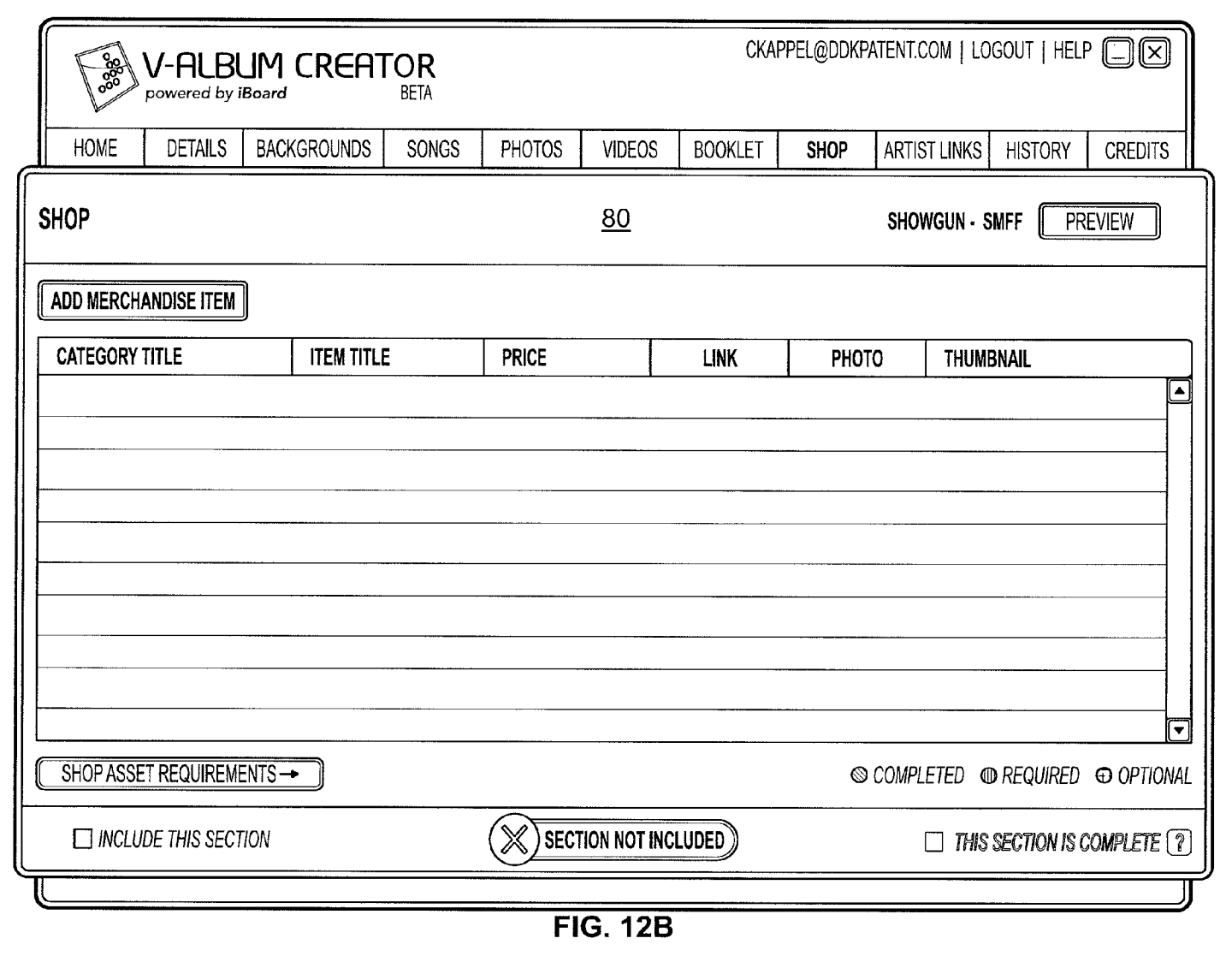
Figure 12C:
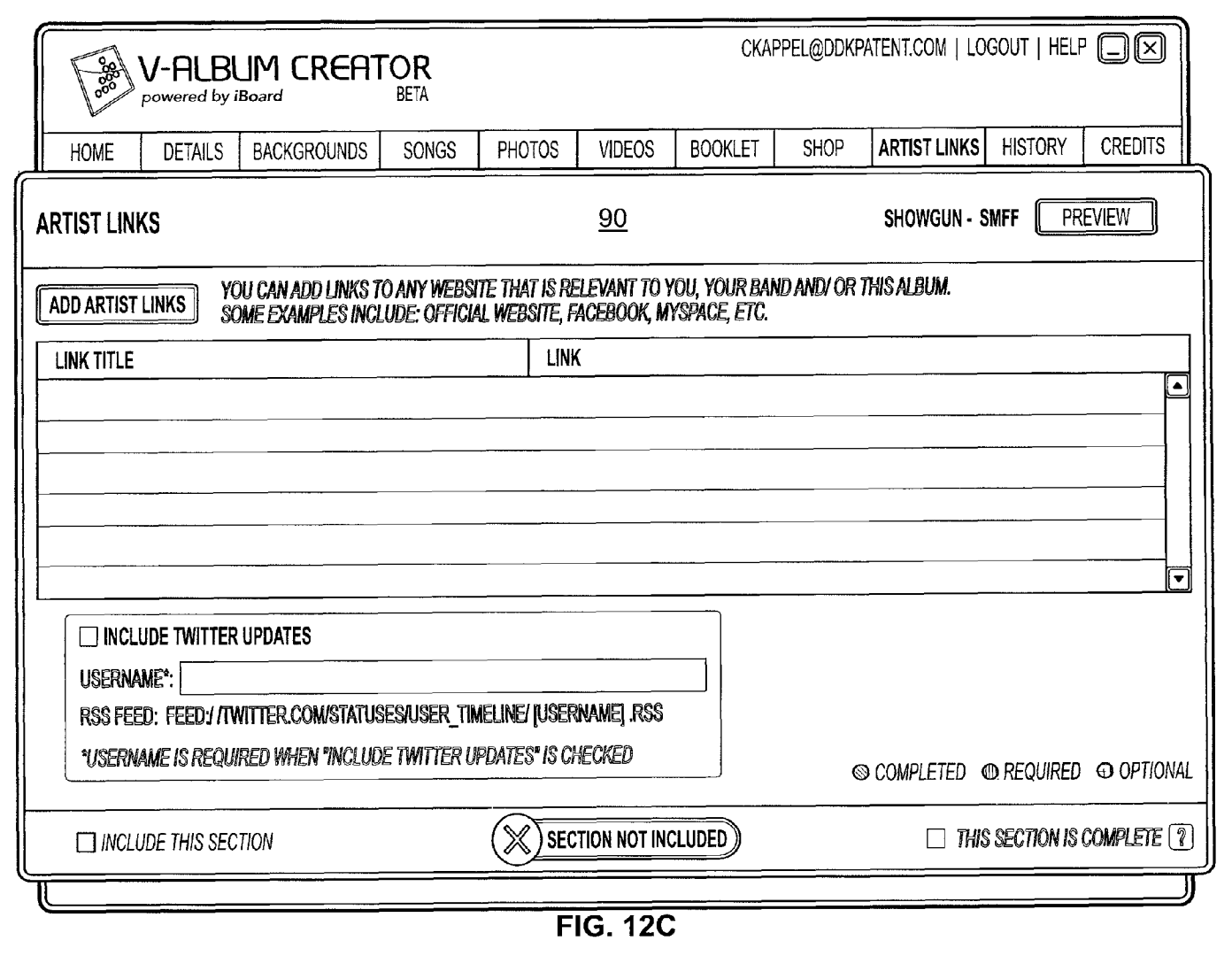
Figure 12D:
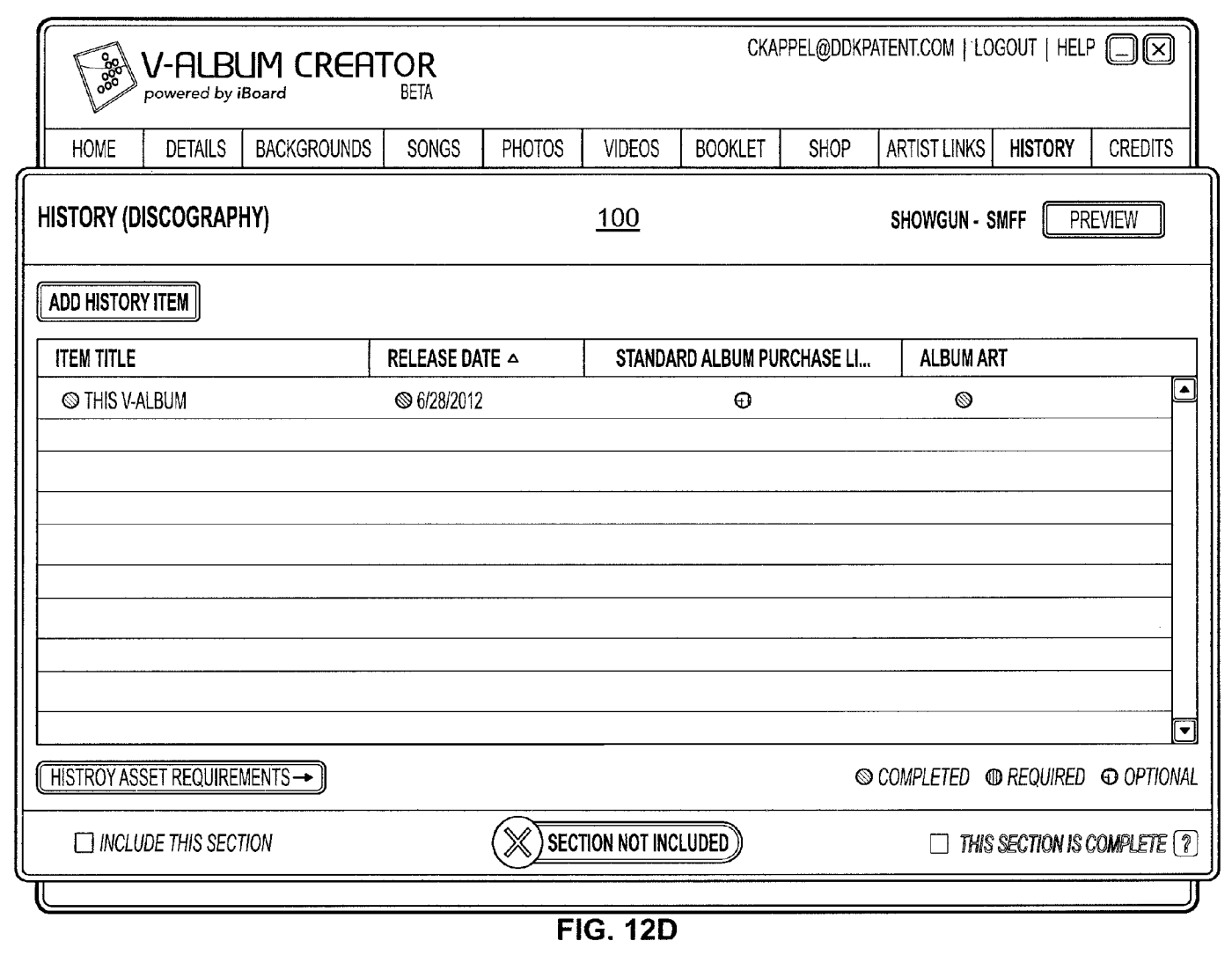

There are also optional sections, which correspond to booklet tab 70, shop tab 80, artist links tab 90, and history tab 100, which are illustrated in FIGS. 12A-D. These screens allow the user to add a booklet (FIG. 12A), merchandise for purchase, such as T-shirts, for example (FIG. 12B), links to the artist's web sites or to social media web sites (FIG. 12C), and a history or discography for the artist (FIG. 12D).

The history tab 100 could include short biographies of band members or artists associated with the particular digital album, and may be associated with images of the same. News articles, press releases, and band-member-authored "statements," e.g., open-letters to fans, etc., may also be included as text media either in the artist links tab 90. Additionally, real-time text may be included. For example, a solo artist or band member may have a blog, micro-blog (e.g., "Twitter™"), or other frequently updated information feed, which may be included in the completed digital album, via automatic updates by entering this information in the artist links tab 90.

Figure 13A:
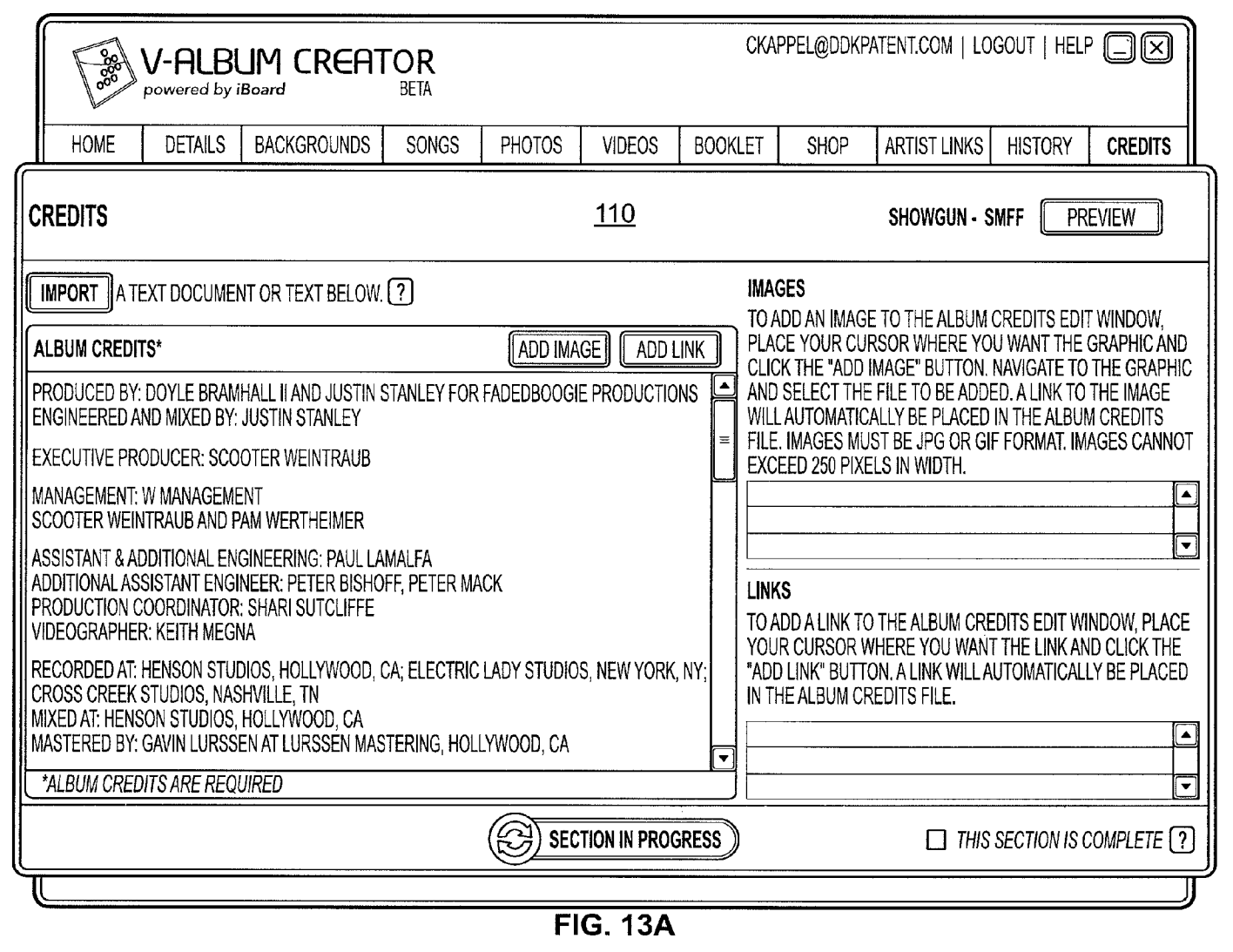
Figure 13B:
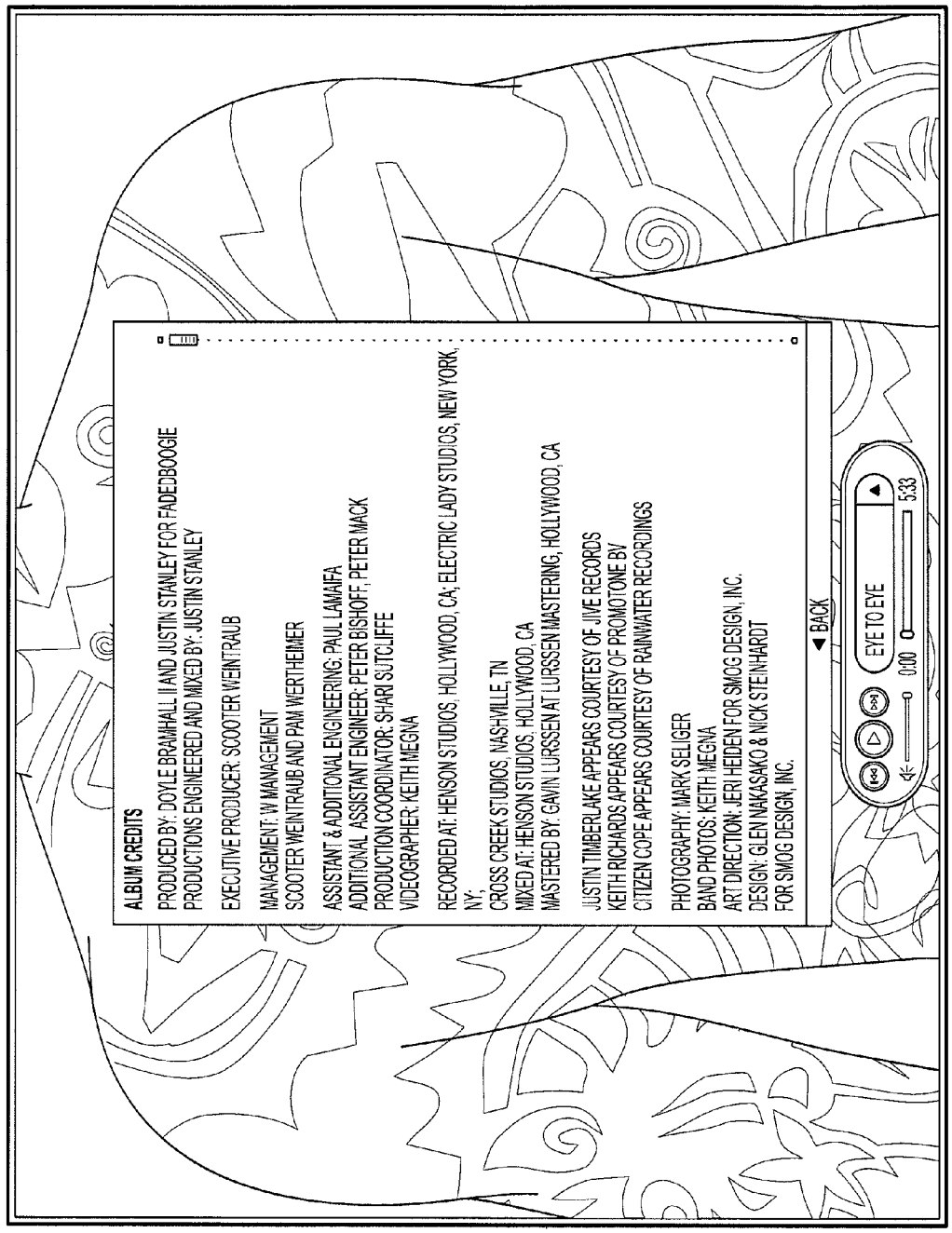
FIG. 13B shows the display of FIG. 10D with the album credits link selected.

Also included is a credits tab 110 screen as illustrated in FIG. 13A, on which the user can enter album credits, internet links, and images. If the album credits link 4080 of FIG. 9A is selected after the information shown in FIG. 13A is entered, the screen of FIG. 13B would be displayed.

Figure 14A:
FIG. 14A shows the display of FIG. 13A with the publish button selected.

As illustrated in FIGS. 4, 6, 8*a*, 10*a*, 11*a*, 12*a*, and 13*a*, on each tab screen there is a check box to indicate whether its associated section is complete. Each checkbox will only be actionable if all required fields on the tab screen have been completed. Once the checkbox on each required section is activated, a publish button 9000 will be displayed or enabled as shown in FIG. 14A. Selecting the publish button 9000 will begin the publishing process in the VAC software, and, for example, an initial informational pop up box 9010 may be displayed providing an overview of the process and allowing the user to cancel or continue with the publishing process. The publishing process includes five stages: (i) providing retail information; (ii) providing legal information; (iii) paying the set up fee; (iv) uploading the V-Album to the publishing server, and (v) completing the upload process and publishing.

Figure 14B:
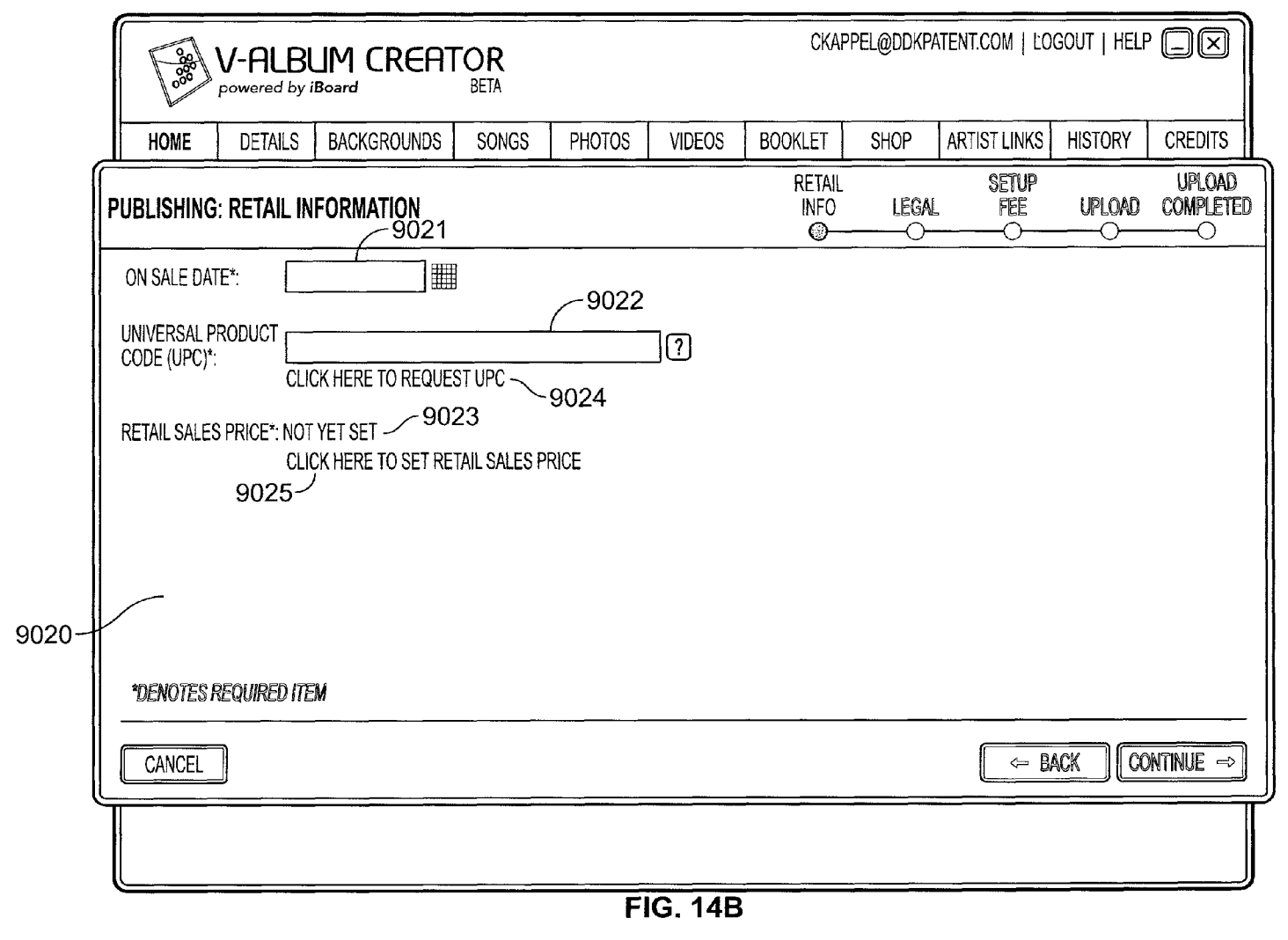
Figure 14E:
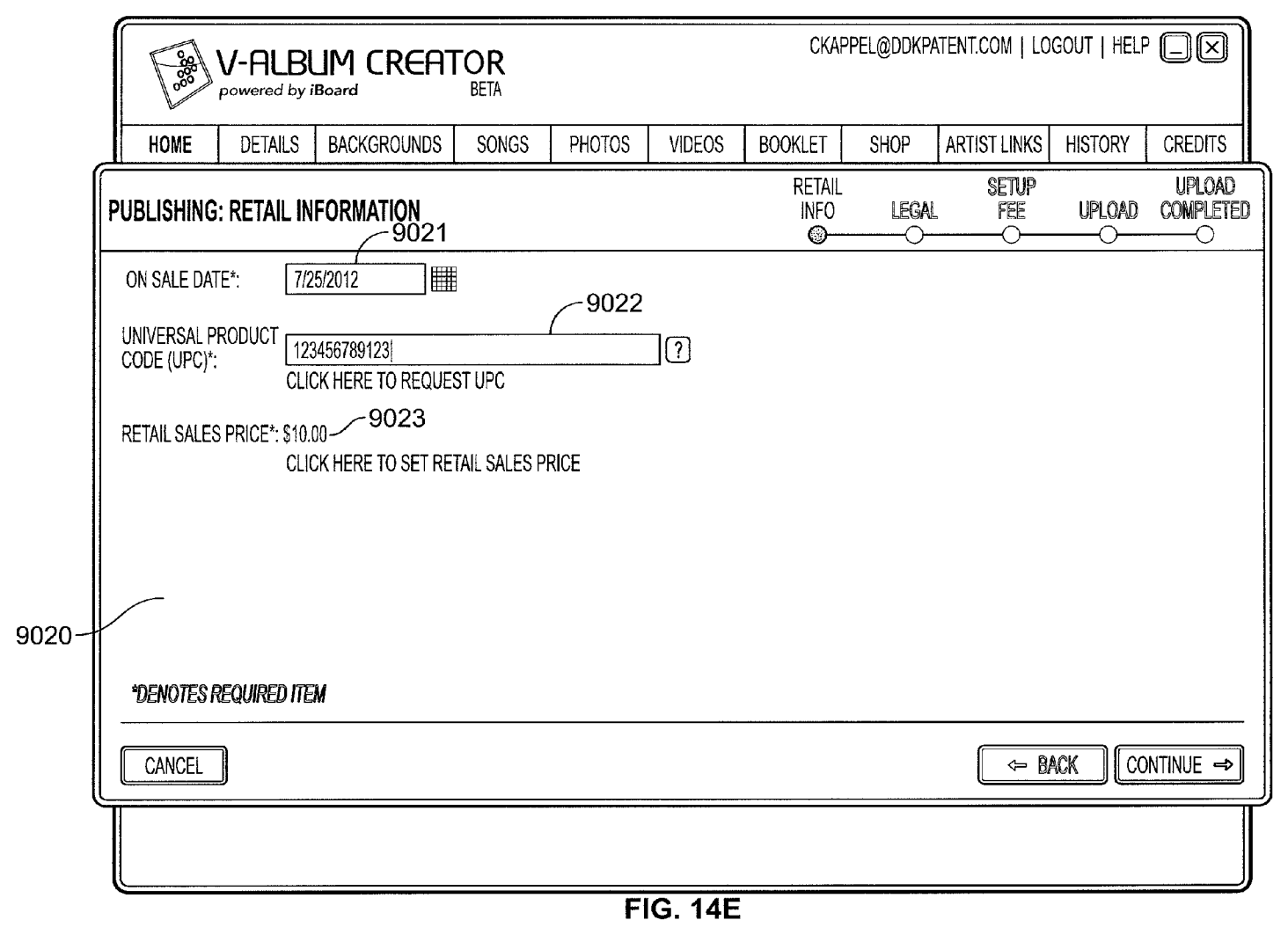

FIG. 14B shows the retail information pop up screen 9020, which asks that the user enter an on sale date 9021, universal product code (UPC) 9022, and retail sales price 9023. As shown, the system will automatically email a UPC code to the user upon selecting the "click here to request UPC" link 9024. FIG. 14C shows the retail price calculator pop up that is displayed when the user selects the "click here to set retail price" link 9025 in FIG. 14B. FIG. 14D shows the display of FIG. 14C after a retail sales price has been entered in field 9026. FIG. 14E shows the display of FIG. 14B with the on-sale date 9021, UPC code 9022, and retail sales price 9023 entered. As shown in FIG. 14D, since all required fields have been entered, the "continue" button can now be selected. Once the continue button is selected, the software proceeds to the legal pop up screen 9030 illustrated in FIG. 15A.

Figure 15B:
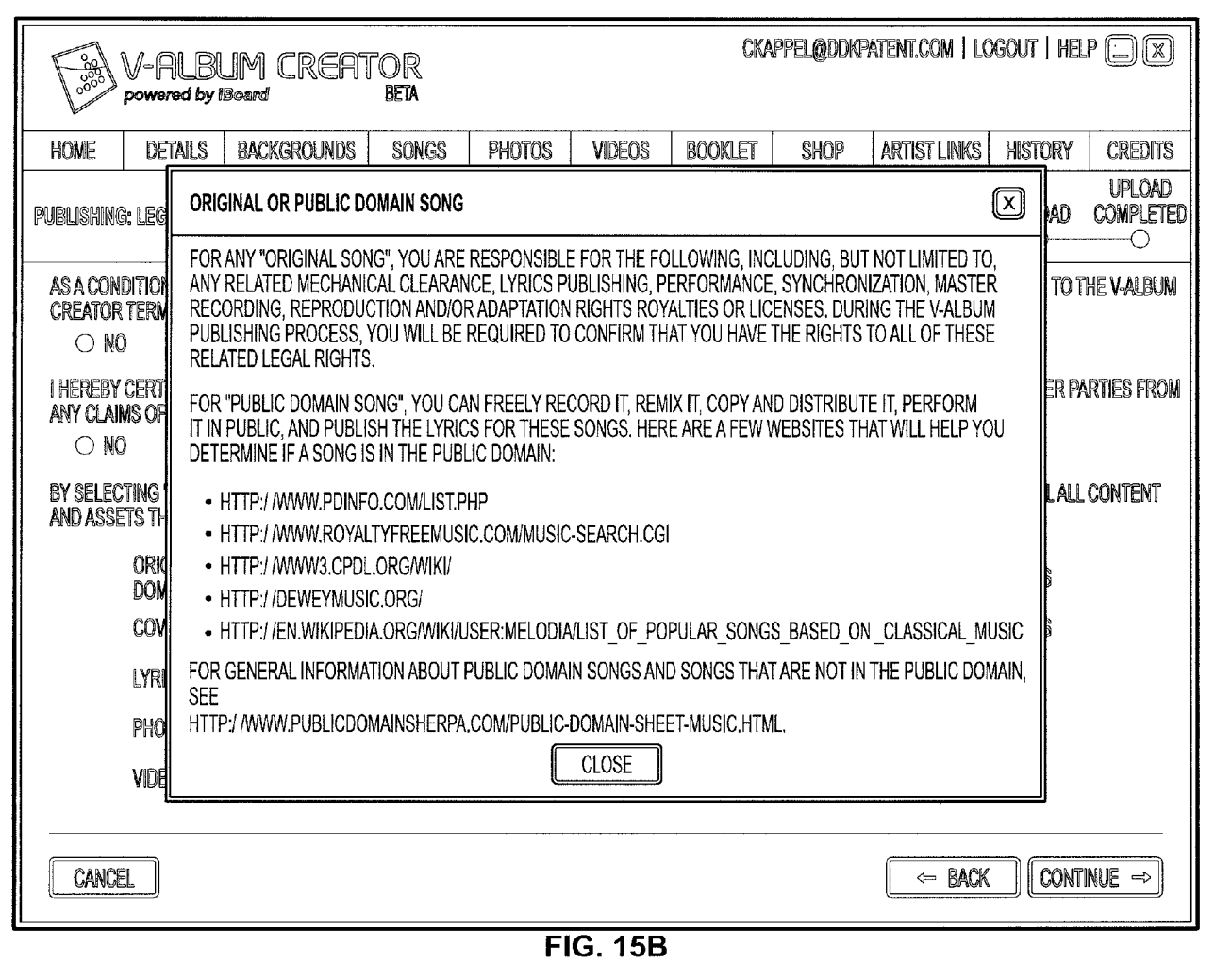
Figure 15C:
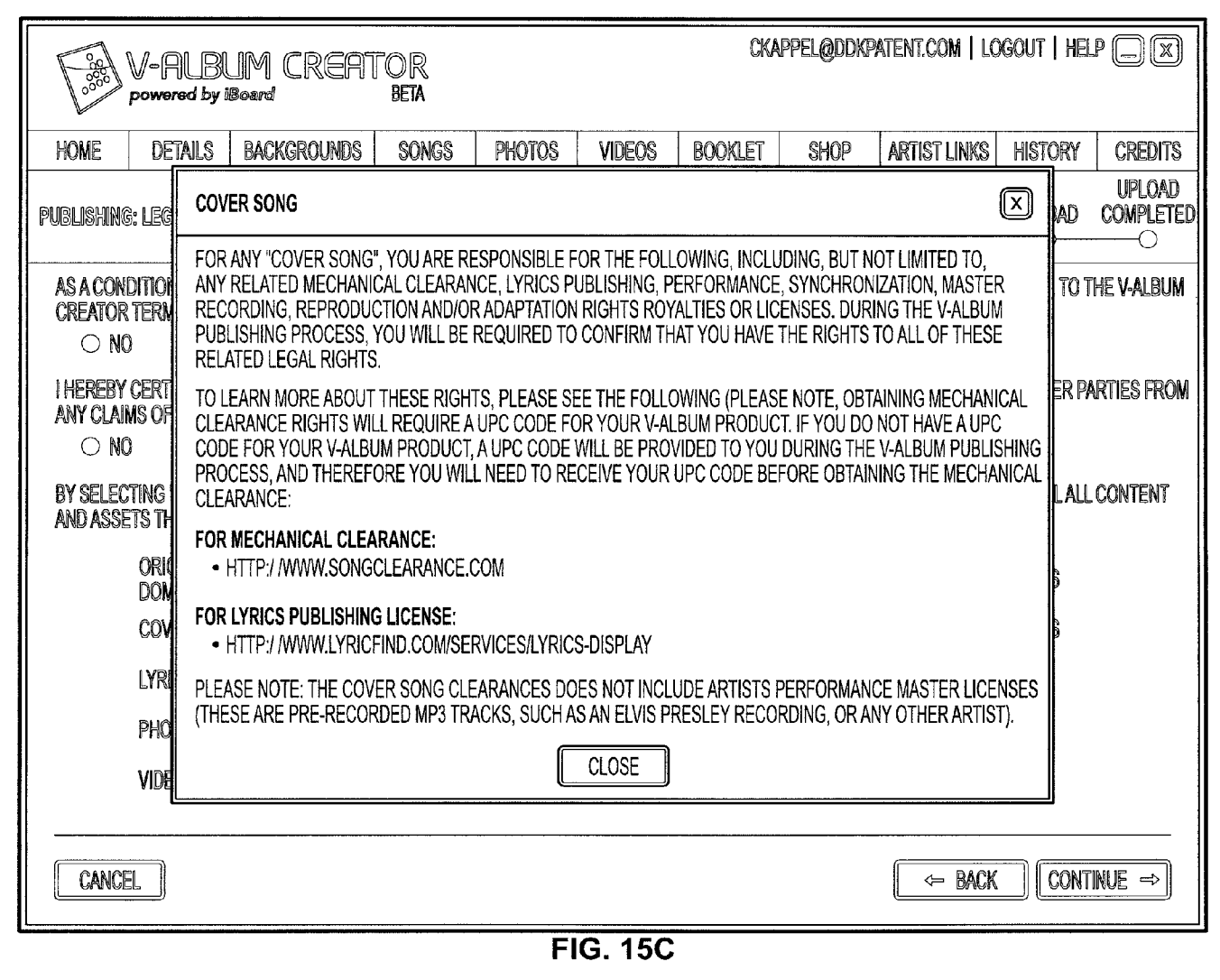
Figure 15D:
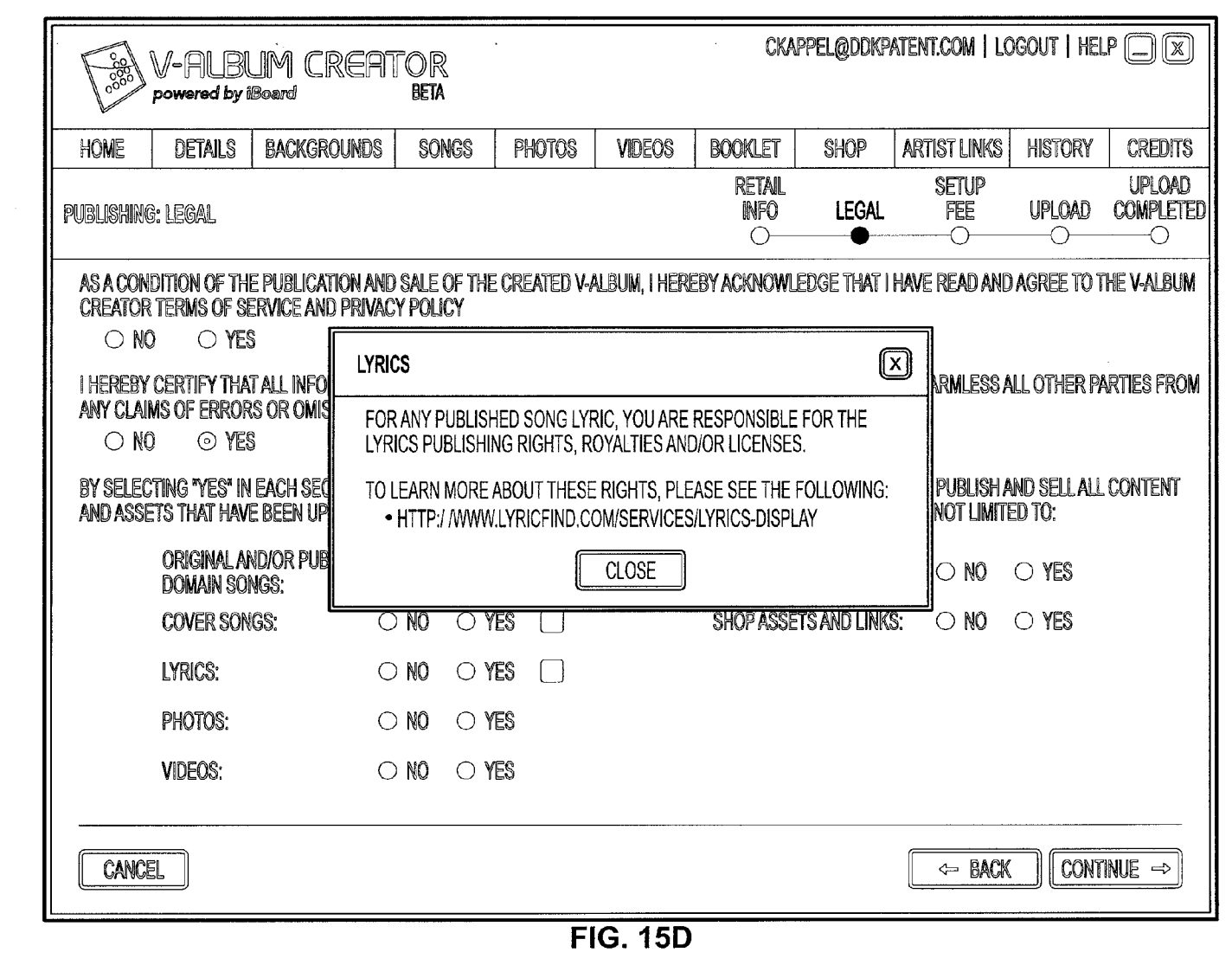
Figure 15E:
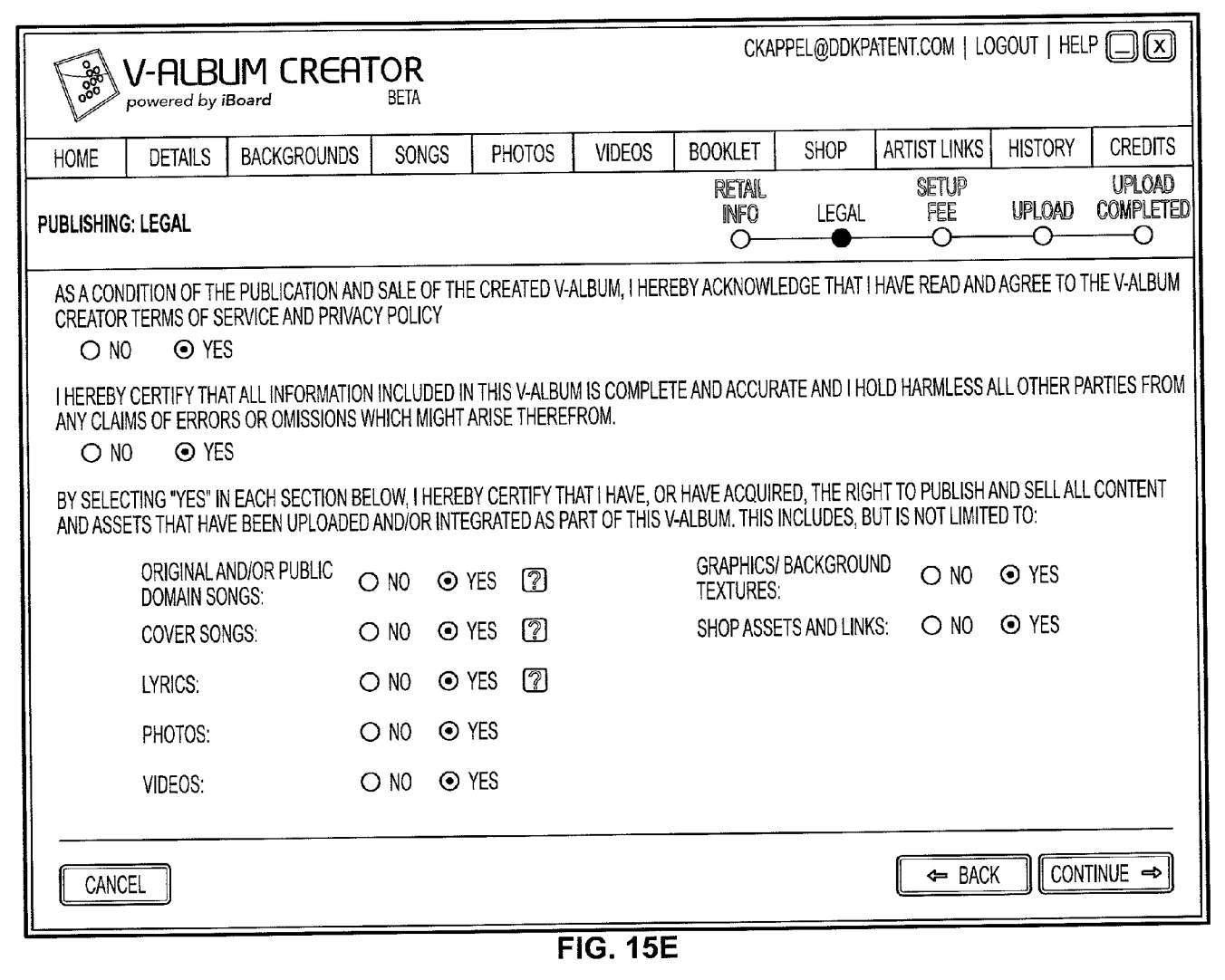

As illustrated in FIG. 15A, the software requires that the user acknowledge the terms of service (9031), and certify that all information provided is complete and accurate (9032). The screen 9030 also requires the user to certify that it has or has acquired the rights to all content to be included in the V-Album, including original and/or public domain songs 9033, cover songs 9034, lyrics 9035, photos 9036, videos 9037, graphics 9038, and shop assets and links 9039. The screen also allows the user to access instructional information regarding these items. For example: by selecting question mark 9040, the software will display information on original or public domain songs as shown in FIG. 15B, by selecting question mark 9041, the software will display information on cover songs as shown in FIG. 15C; and by selecting question mark 9042, the software will display information on lyrics as shown in FIG. 15D. FIG. 15E shows the screen of FIG. 15A with all information included. Comparing FIGS. 15A and 15E, in FIG. 15E the continue button is now active, whereas in FIG. 15A it is shaded to indicate that it is inactive.

Figure 16A:
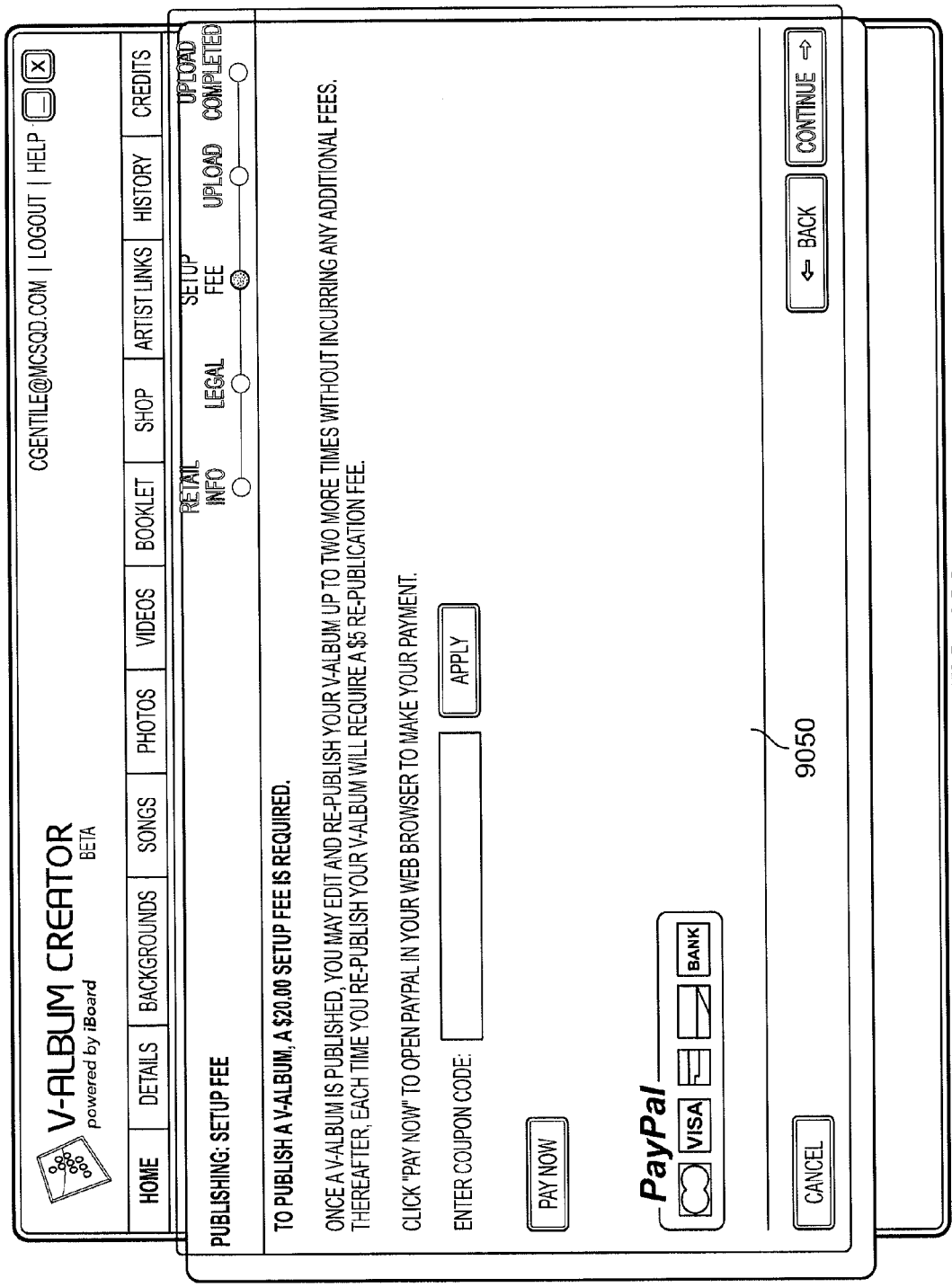
FIG. 16A shows the set up fee pop up screen.
Figure 16B:
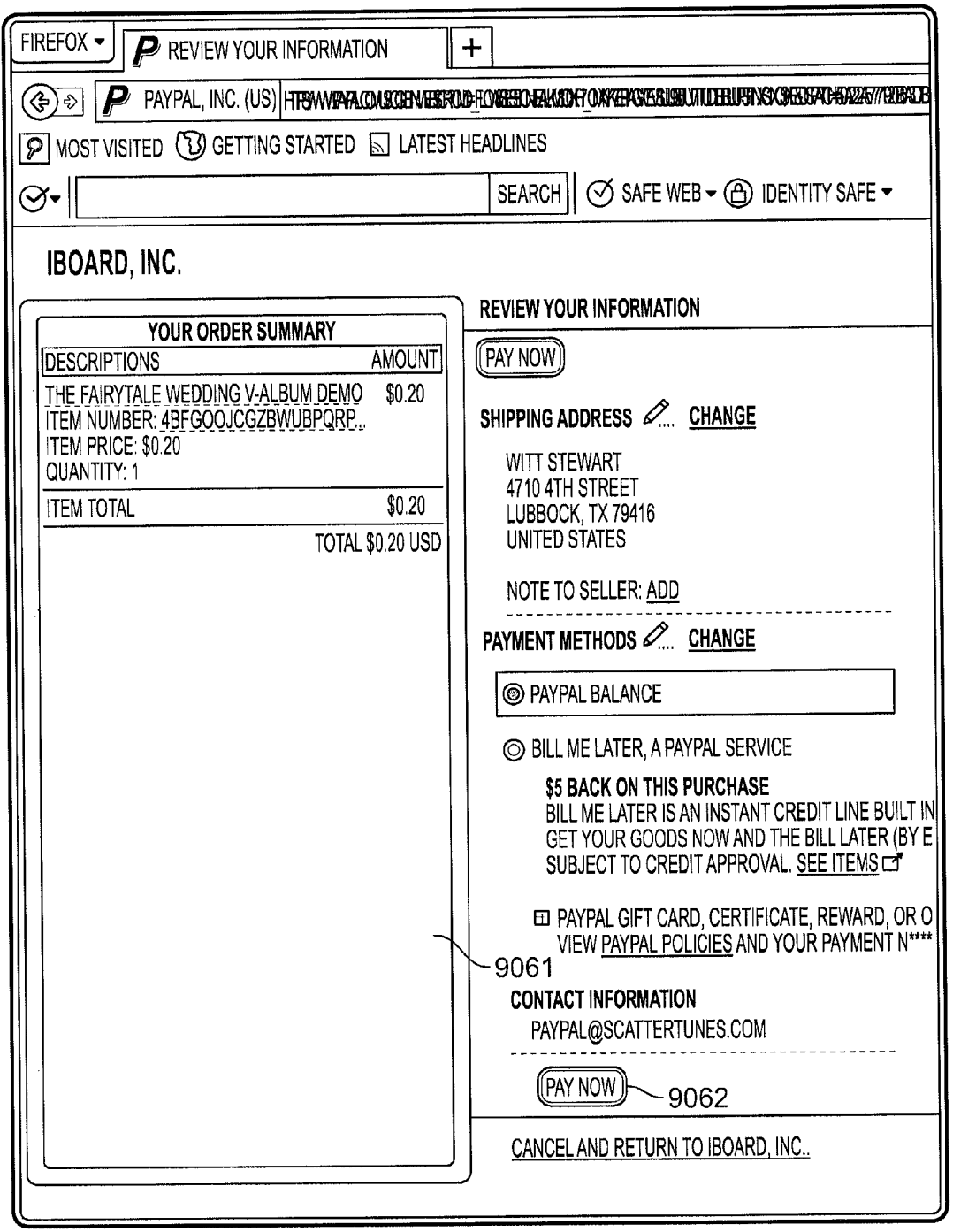
FIG. 16B shows a payment screen for paying the set up fee.
Figure 16C:
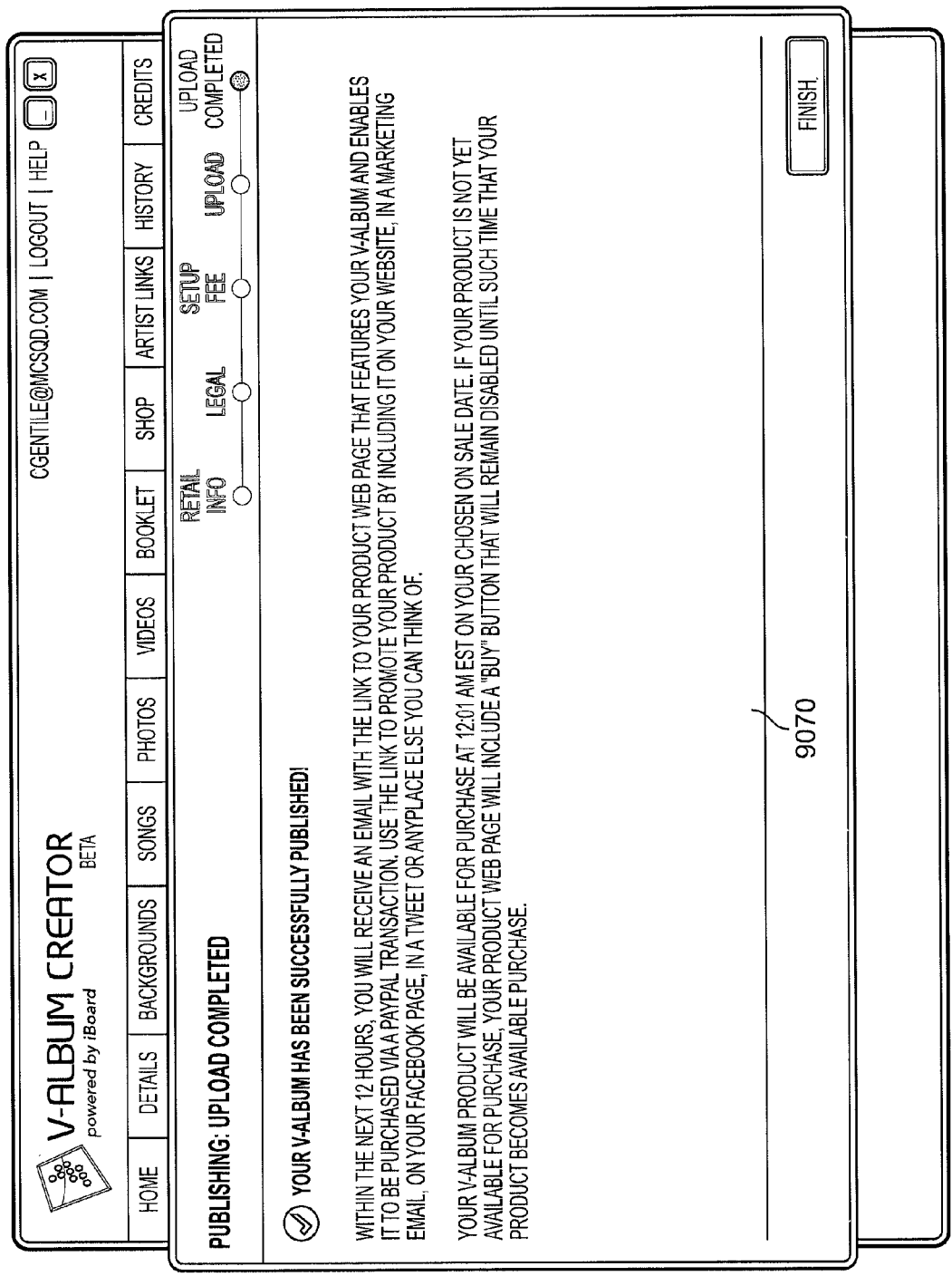
FIG. 16C shows an upload completed screen.
Figure 16E:
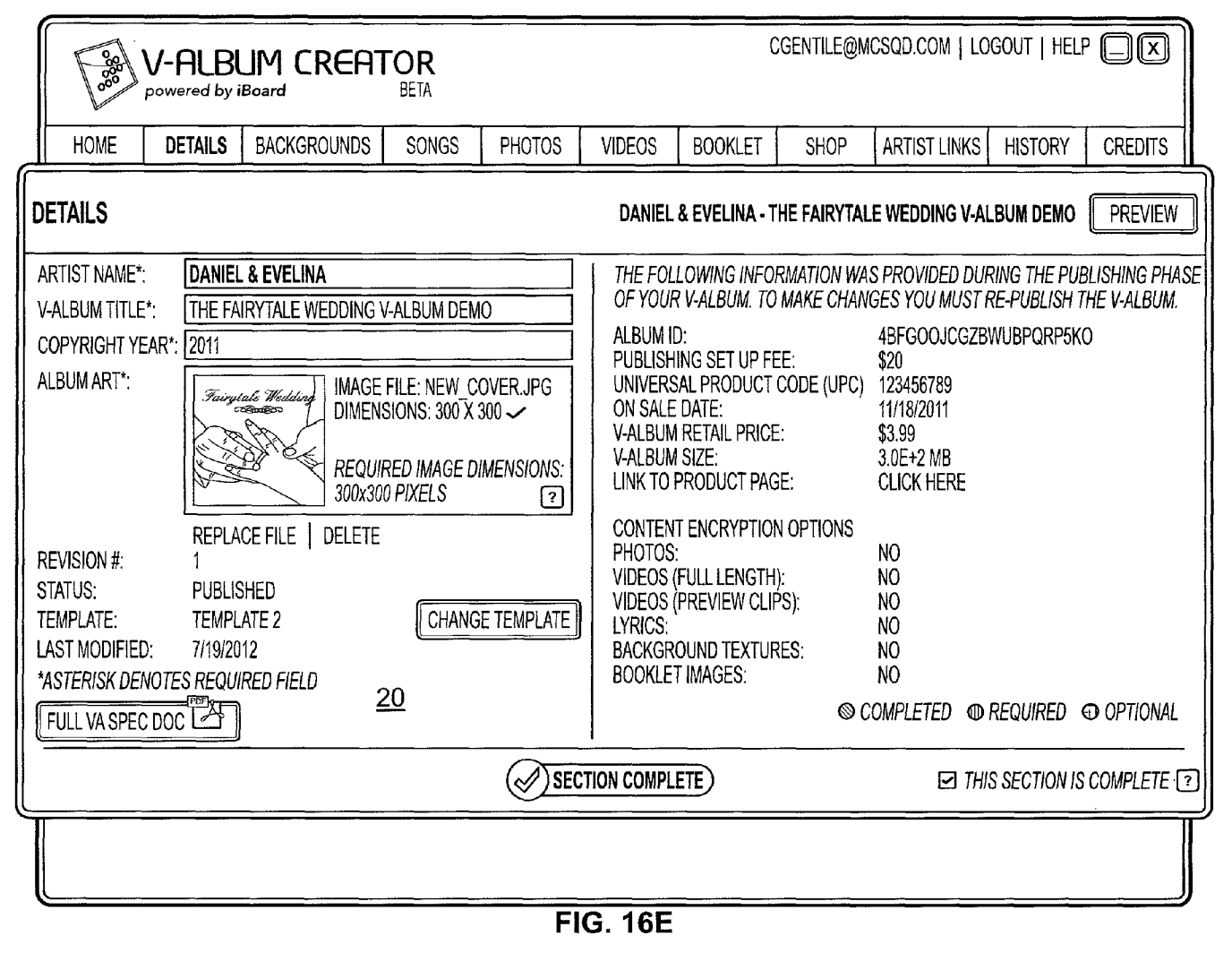

Upon selecting the continue button in FIG. 15E, the software proceeds to display the setup fee pop up screen 9050 of FIG. 16*a*. From this screen, the user can pay the set up fee, or enter a coupon that may eliminate or reduce the fee. FIG. 16B shows a payment screen, which includes an order summary 9061 and a payment button 9062. Upon user selection of the payment button, the V-Album is uploaded. FIG. 16C illustrates an upload completed screen 9070 which informs the user that the V-Album has been successfully published. Publication also causes changes in the home tab screen and the details tab screen. For example, referring to FIGS. 16(*d*) and (*e*), the published V-Album now has a status of published on the home tab screen 10, and the detailed information regarding the published V-Album is shown on the details tab screen 20, including album id, set up fee paid, UPC, on sale date, retail price, size, and link to product page.

Figure 17A:
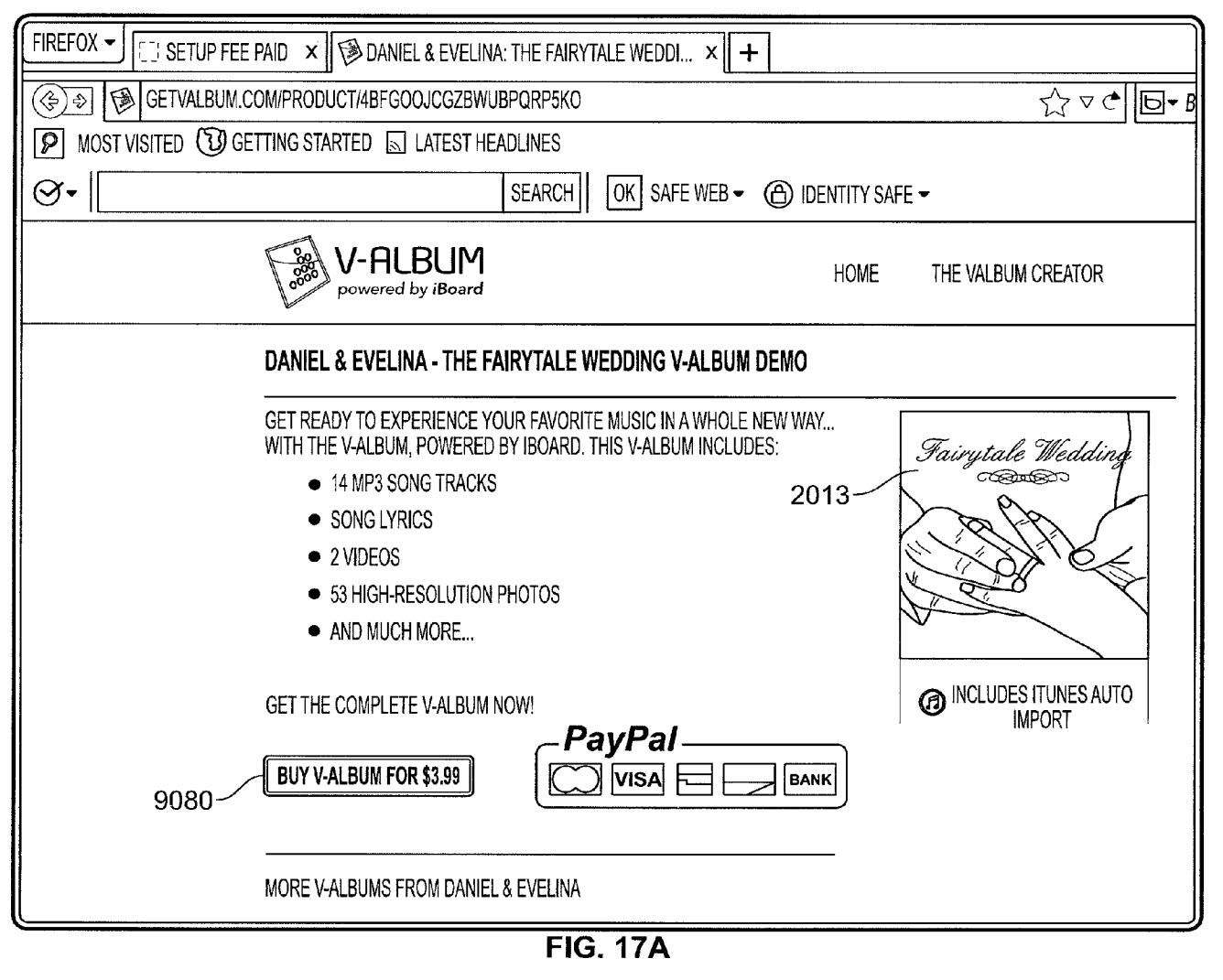
Figure 17B:
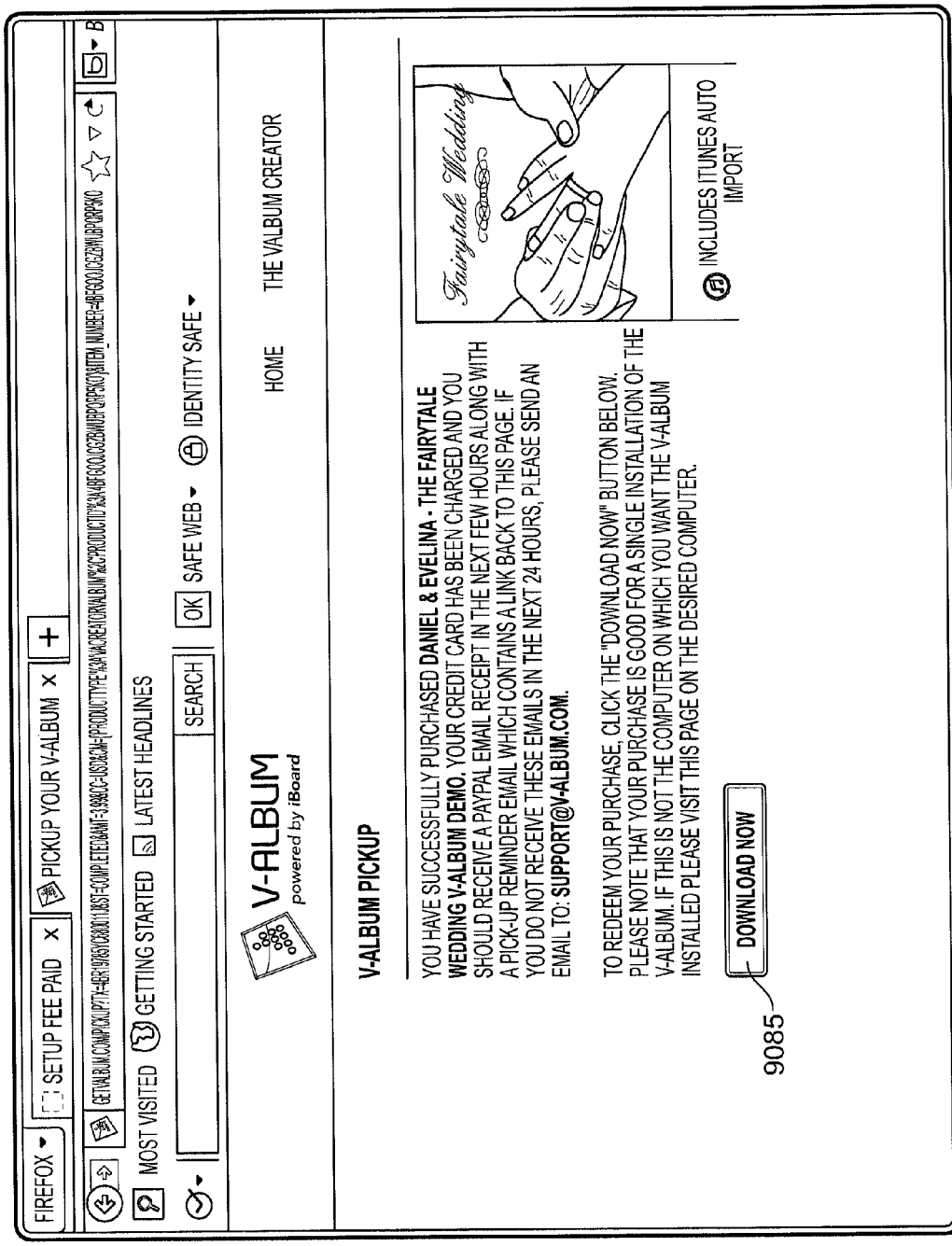
FIG. 17B shows a download web page for allowing a consumer who has purchased the published digital media album to download it.

As described above, the digital media album, when published, is available for purchase on a custom web page associated with the artist. FIG. 17(*a*) illustrates an exemplary web page, which includes a purchase button 9080 as well as information about the V-Album including the album art 2013 (from FIG. 4), the artist name, the album name, the sales price (in this case as text in button 9080), and information regarding the contents of the album. In this case, summary level information is shown. However, additional information such as the name of each song could also be included. After the consumer has paid for the V-Album by selecting button 9080, a purchased album download page is displayed (FIG. 17*b*). Upon selecting the download button 9085, the consumer can download the purchased V-Album.

Figure 18:
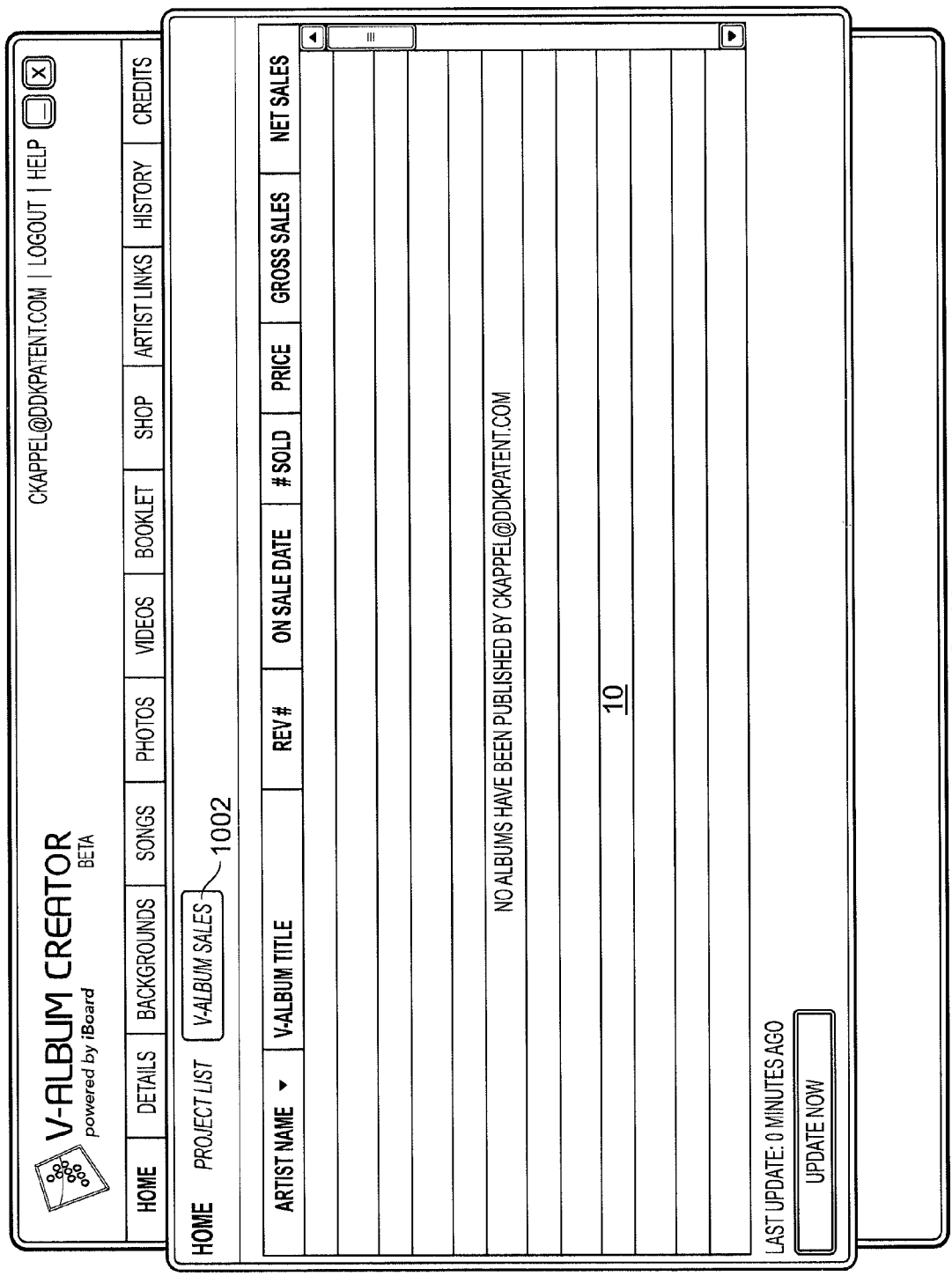
FIG. 18 shows a real time sales tracking screen.

As explained above, the VAC software also allows the user to track sales information for his or her V-Album. FIG. 18 shows the home tab screen 10 after the V-Album Sales link has been selected. Under V-Album sales, the system will display, for each V-Album: artist name, album title, revision number, on sale date, number sold, price, gross sales, and net sales. This sales data is available in real-time, and the user can update the sales data display at any time by selecting the "update now" button on the lower left of the screen.

In accordance with further embodiments of the present invention, non transitory computer readable media are provided, having stored thereon, computer executable process steps operable to control a computer to perform the steps described herein.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A computer program product residing on non-transitory computer readable media operable to control a computer to perform a computerized method for allowing a user to create a digital multimedia album through a graphical user interface, the created digital multimedia album including media album components including at least a name, a plurality of audio media, a plurality of image media, and text associated with each of the plurality of audio media, the method comprising, performing, with a computer the steps of:
   (a) receiving from the user a selection of one of a plurality of templates for the digital media album, each template defining at least a layout of the media album components in the created digital media album, a navigation among components of the created digital multimedia album, and a sequence of display of the media album components of the created digital multimedia album;
   (b) receiving from the user a subset of the media album components;
   (c) in response to a user input to the graphical user interface, compiling an interim digital multimedia album using the selected template, the subset of media album components, and default data for each media album component not included in the subset of media album components, and thereafter displaying to the user the interim digital multimedia album, wherein the displayed interim digital multimedia album includes the layout, navigation, and the sequence of display of the selected template;
   (d) receiving from the user additions to the subset of the media album components, and repeating step (c) with the subset including said additions;
   (e) receiving from the user further additions to the subset of the media album components until all of said media album components are received;
   (f) compiling the created digital multimedia album using the selected template and said media album components.

2. The product of claim 1, wherein the created digital multimedia album is created as a single data file from which individual digital audio files can be extracted.

3. The product of claim 2, wherein the single data file includes the digital audio files and remaining data, wherein the remaining data includes Digital Rights Management (DRM) and wherein the digital audio files include DRM.

4. The product of claim 2, wherein the single data file includes the digital audio files and remaining data, wherein the remaining data includes Digital Rights Management (DRM) and wherein the digital audio files do not include DRM.

5. The product of claim 1, wherein the interim digital multimedia album is created as a single data file from which individual digital audio files can be extracted.

6. The product of claim 1, wherein the media album components include video.

7. The product of claim 1, wherein the plurality of audio files includes digital audio files of a single artist or band, or multiple artists and bands, wherein the text associated with each of the plurality of audio files includes a song title and song lyrics associated with each of the plurality of audio files.

8. The product of claim 7, wherein media album components include digital video, the digital video including performances by the single artist or band.

9. The product of claim 1, wherein the plurality of images include an album cover image.

10. The product of claim 9, wherein the plurality of images further includes a background texture image, and wherein the media album components further include a color theme.

11. The product of claim 1, further comprising
   uploading the created digital multimedia album to a server;
   receiving, at the server, a request from a consumer to purchase the created digital multimedia album;
   processing, at the server, payment from the consumer; and
   downloading the created digital multimedia album to the consumer.

12. The product of claim 11, further comprising:
   receiving, from the user, information regarding publishing rights and/or cover rights associated with the media components.

13. The product of claim 12, further comprising:
   automatically purchasing at least some of the publishing rights and/or the cover rights.

14. The product of claim 12, further comprising:
   automatically paying royalties to a third party in accordance with the publishing rights and/or the cover rights in association with each sale of the created media album.

15. The product of claim 11, wherein the step of uploading includes receiving from the user, a publishing fee.

16. The product of claim 11, wherein the publishing fee authorizes the user to sell the created digital multimedia album a limited number of times.

17. The product of claim 11, wherein said step of uploading includes:
   uploading the created media album onto a custom web page for said created media album, said custom web page having a unique URL, the custom web page including a cover image for the created digital multimedia album, a description of the created media album, a sales price of the created digital multimedia album, and a purchase button.

18. The product of claim 17, wherein the step of uploading includes
   receiving from the user, a publishing fee, wherein the publishing fee authorizes the user to sell the created digital multimedia album a number of times N, wherein $1 < N < \infty$; and
   disabling the custom web page after a number of purchases from consumers equals N.

19. The product of claim 11, further comprising providing in response to user input, a report of all sales of the created digital multimedia album.

20. The product of claim 19, wherein the report is a real-time sales report.

* * * * *